US006397780B1

(12) United States Patent
Youngstrom

(10) Patent No.: US 6,397,780 B1
(45) Date of Patent: Jun. 4, 2002

(54) UNDERWATER APPARATUS FOR AN AQUARIUM AND RELATED METHODS

(76) Inventor: James Scott Youngstrom, 4220 E. 653 North, Rigby, ID (US) 83442

(*) Notice: Subject to any disclaimer, the term of this patent is extended or adjusted under 35 U.S.C. 154(b) by 0 days.

(21) Appl. No.: 09/598,884

(22) Filed: Jun. 21, 2000

Related U.S. Application Data

(60) Continuation-in-part of application No. 09/397,590, filed on Sep. 16, 1999, now abandoned, which is a division of application No. 09/226,533, filed on Mar. 11, 1999, now Pat. No. 6,029,606, which is a division of application No. 09/059,898, filed on Apr. 14, 1998, now Pat. No. 5,957,085.

(51) Int. Cl.[7] ............................................. A01K 63/00
(52) U.S. Cl. ................................... 119/246; 119/248
(58) Field of Search .................... 119/246–248, 251, 119/256, 263; D30/105

(56) References Cited

U.S. PATENT DOCUMENTS

| | | | |
|---|---|---|---|
| 2,751,880 A | * 6/1956 | Markowski | |
| 3,141,442 A | * 7/1964 | Harris | 119/246 |
| 3,699,921 A | * 10/1972 | Janicek | 119/246 |
| 3,804,064 A | 4/1974 | Kuneman et al. | 119/5 |
| 4,204,499 A | * 5/1980 | Leyva et al. | 119/246 |
| 4,300,478 A | 11/1981 | Wise | 119/5 |
| 4,787,336 A | 11/1988 | Lineberry | 119/5 |
| 4,788,938 A | 12/1988 | Davenport | 119/5 |
| 4,920,922 A | * 5/1990 | Tominaga | 119/265 |
| 4,958,593 A | 9/1990 | Hurlburt et al. | 119/5 |
| 4,995,334 A | 2/1991 | Wechsler | 119/5 |
| 5,000,118 A | 3/1991 | Merritt et al. | 119/5 |
| 5,031,572 A | * 7/1991 | Dana | 119/246 |
| 5,040,489 A | 8/1991 | Drake | 119/5 |
| 5,056,463 A | 10/1991 | Wilkins et al. | 119/5 |
| 5,121,709 A | 6/1992 | Wechsler | 119/5 |
| 5,135,400 A | 8/1992 | Ramey | 119/5 |
| 5,183,004 A | 2/1993 | Trent et al. | 119/5 |
| 5,313,912 A | * 5/1994 | O'Dell | 119/246 |
| 5,337,701 A | * 8/1994 | Syers | 119/251 |
| 5,445,112 A | 8/1995 | Grosman | 119/265 |
| 5,732,657 A | * 3/1998 | Idbeis | 119/257 |
| 5,957,085 A | * 9/1999 | Youngstrom et al. | 119/246 |

* cited by examiner

Primary Examiner—Charles T. Jordan
Assistant Examiner—Kimberly S. Smith
(74) Attorney, Agent, or Firm—Lynn G. Foster

(57) ABSTRACT

Novel strictures and methods are disclosed for creating and maintaining an underwater air chamber beneath a volume of water within a conventional aquarium for access by amphibious life within the aquarium to permit the amphibious life to selectively leave a water environment for a dry environment. In one embodiment, the underwater air chamber includes a hood secured to a base which defines a hollow chamber. After the apparatus is submerged in an aquarium, pressurized gas is introduced into the hollow chamber to create a dry environment within the hollow chamber. A gas effluent control is associated with the hood to selectively release the gas under pressure from within the chamber. An entryway into the chamber is also formed in the hood to permit amphibious life to selectively enter and exit the chamber, as well as to permit larger air bubbles to escape from within the air chamber. Another embodiment discloses an underwater air chamber formed integrally with an aquarium. Structures and methods are also disclosed for delivering a food object to a submerged air chamber from above the water surface of an aquarium. Compact versions and multiple island versions are also disclosed.

19 Claims, 20 Drawing Sheets

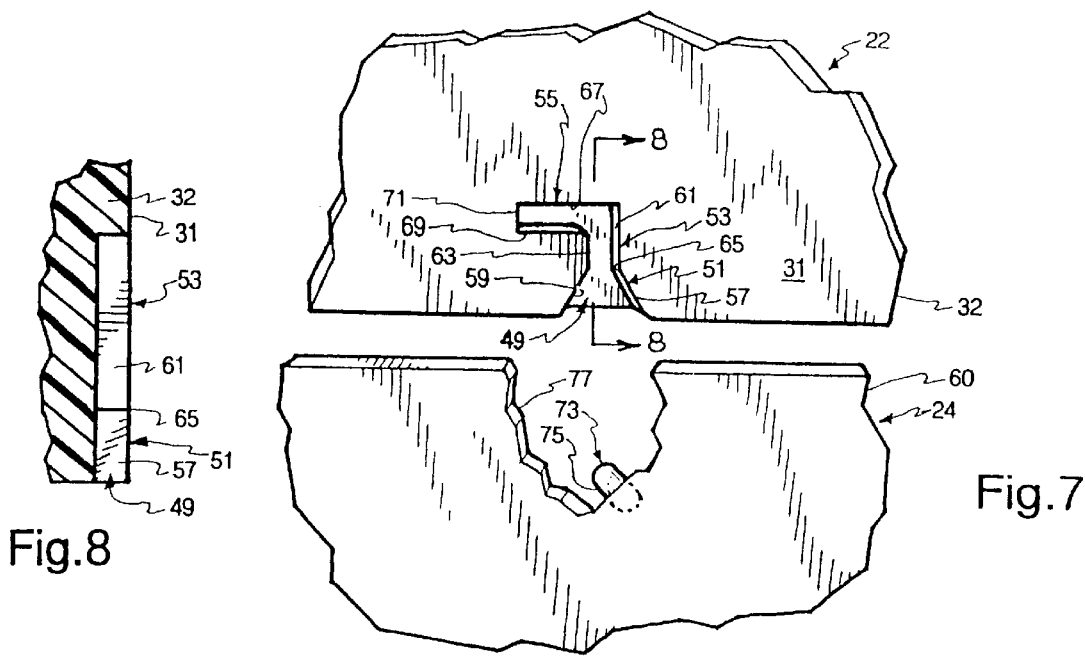
Fig. 7
Fig. 8
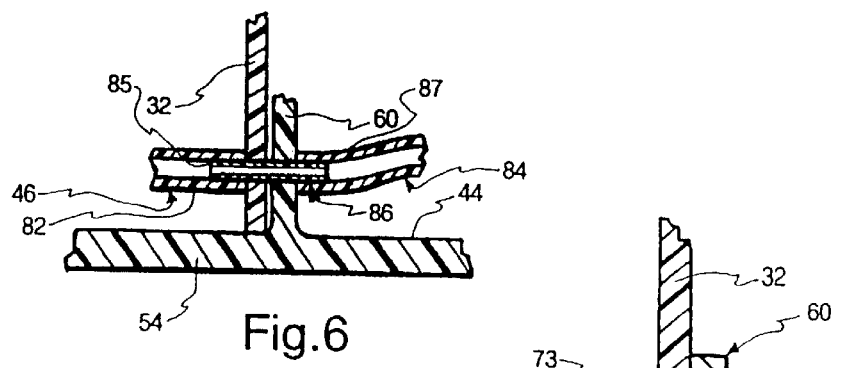
Fig. 6
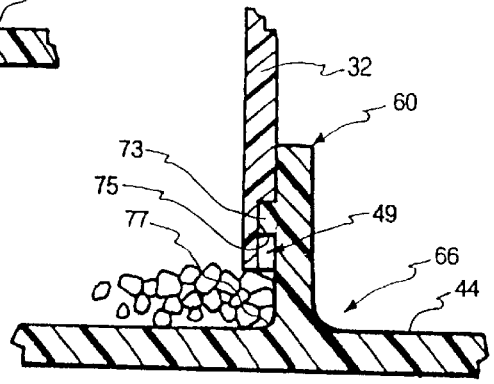
Fig. 9
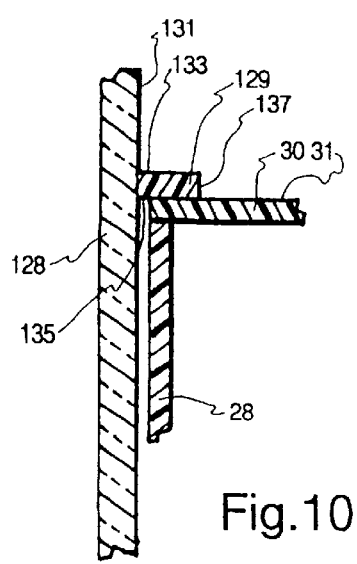
Fig. 10

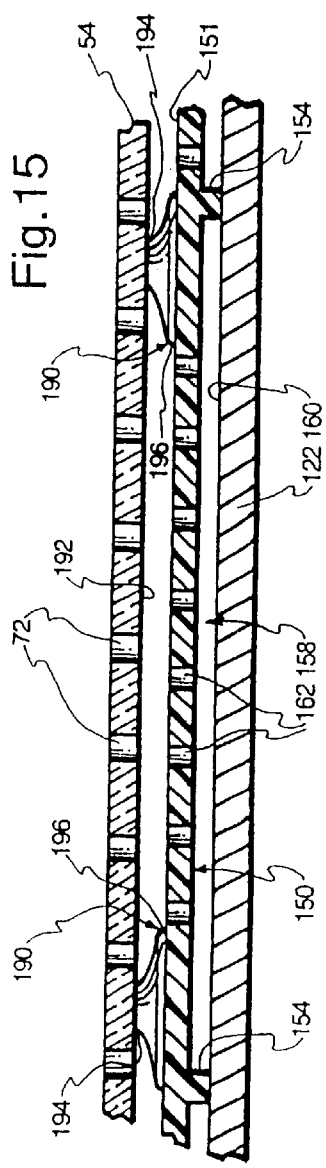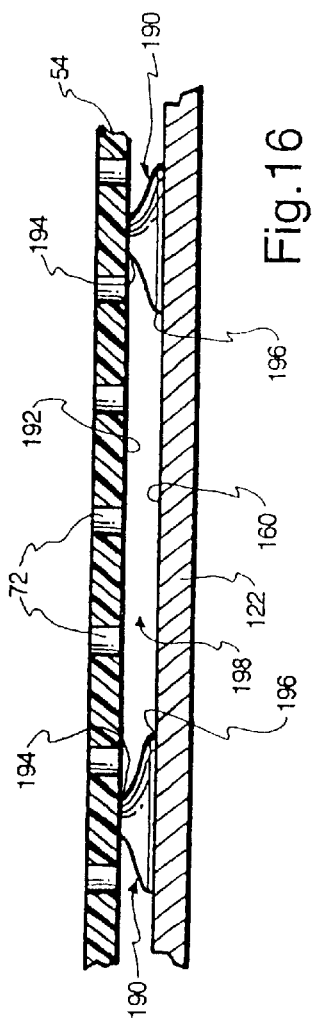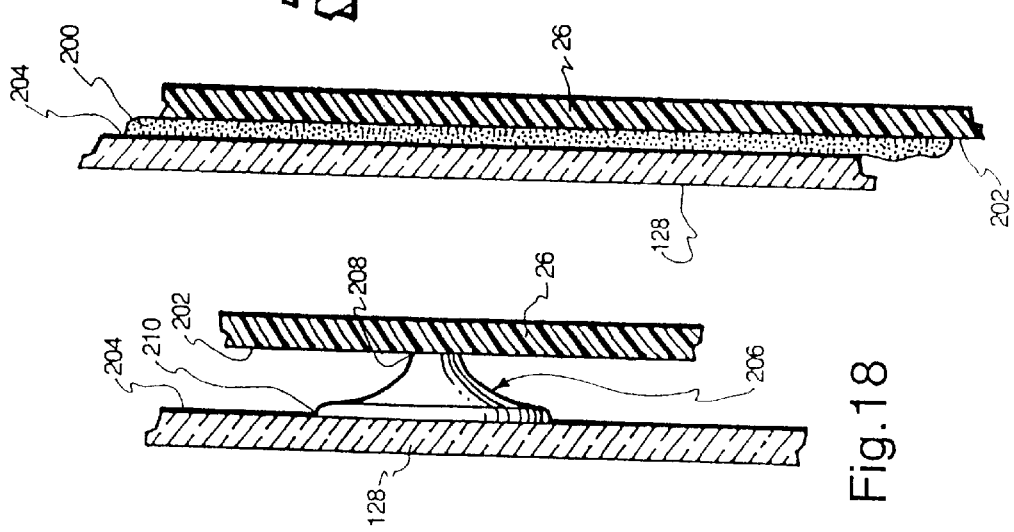

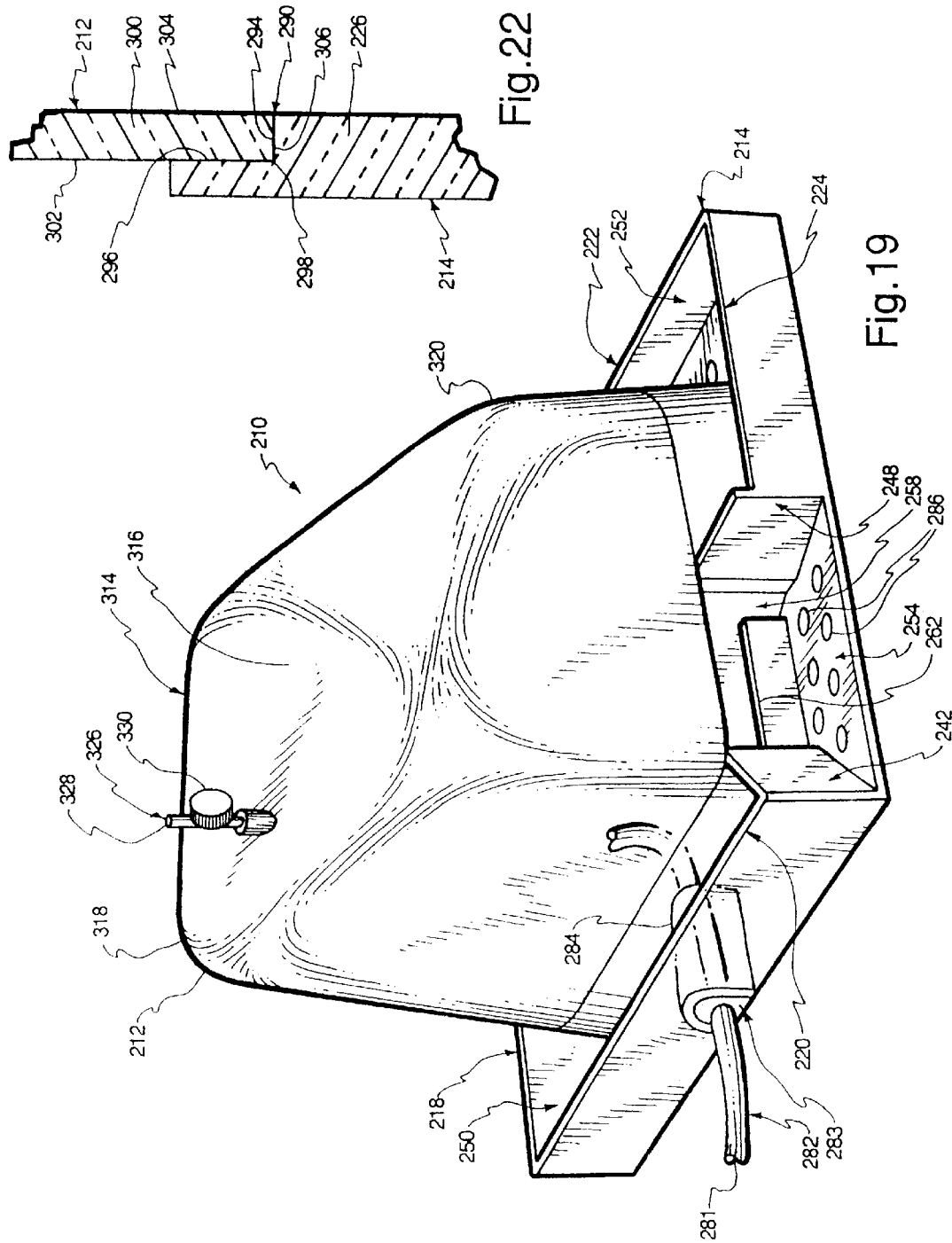

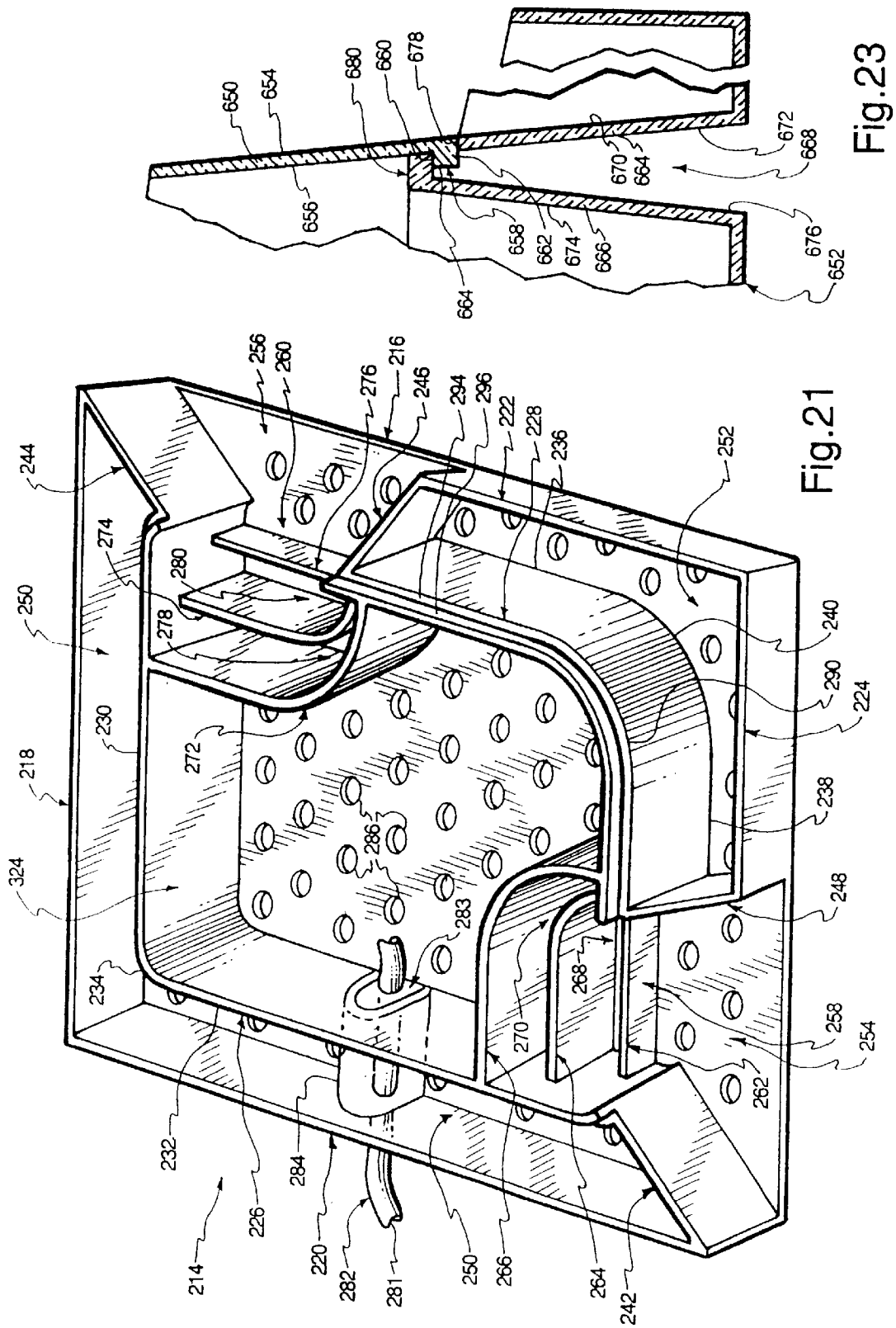

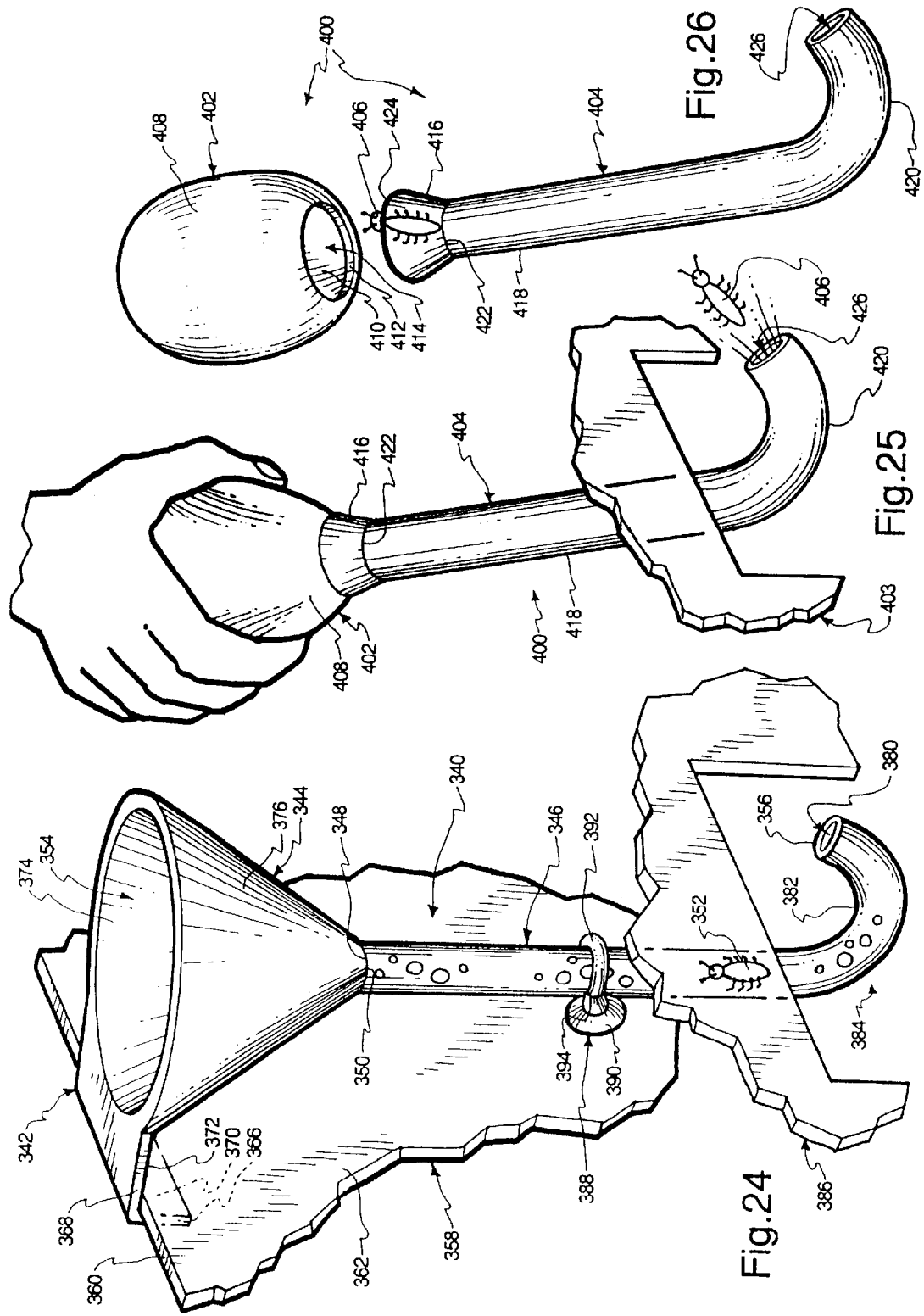

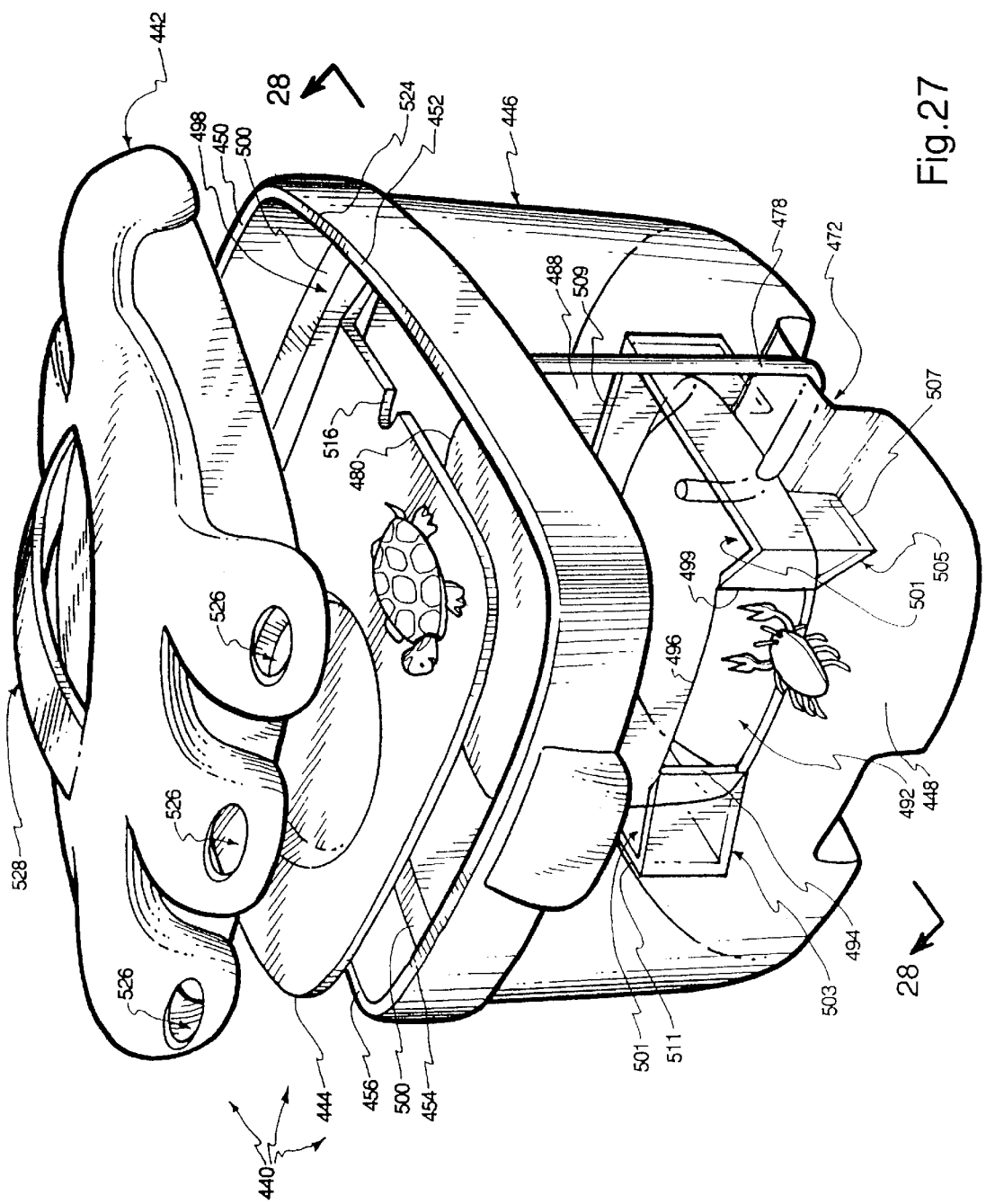

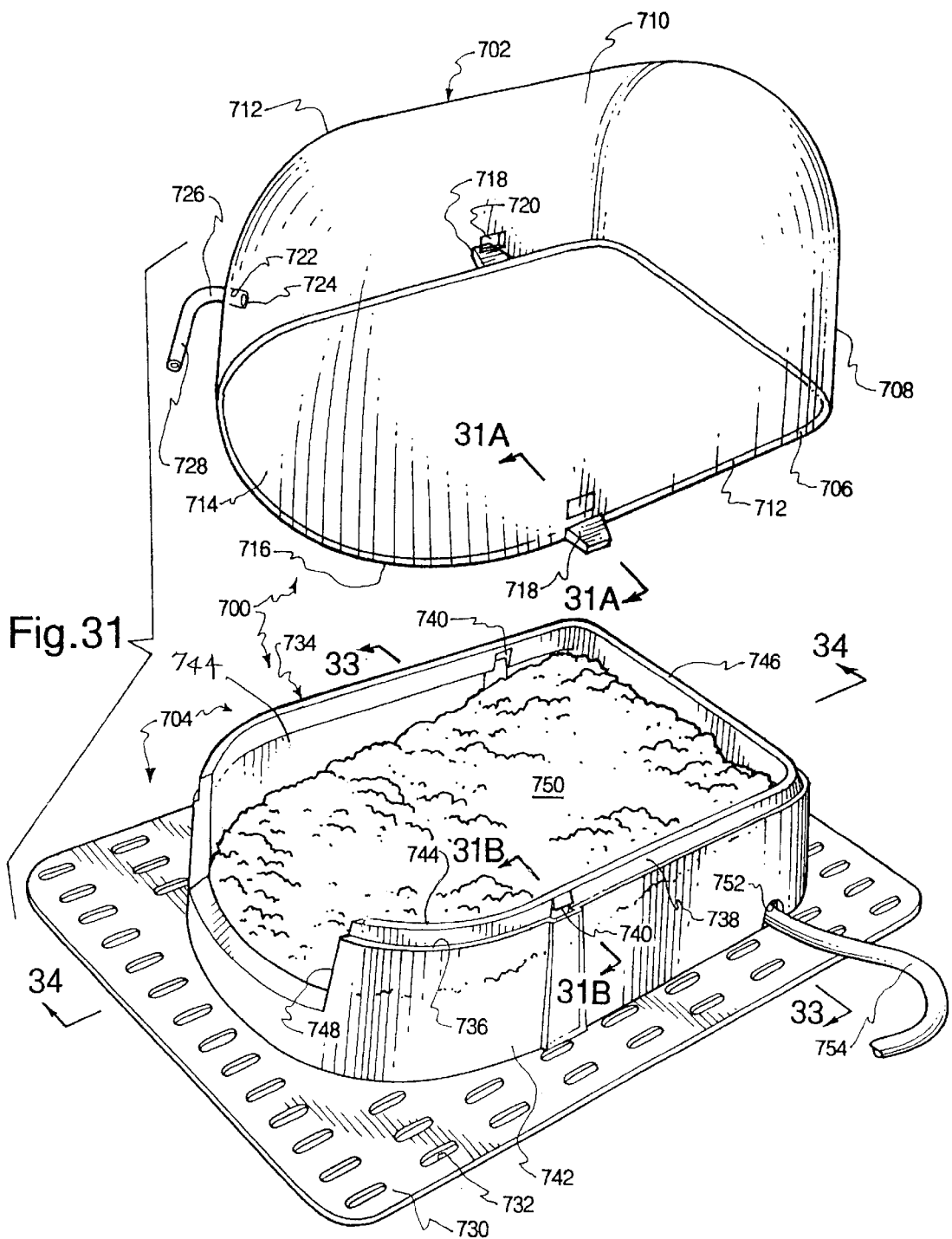

UNDERWATER APPARATUS FOR AN AQUARIUM AND RELATED METHODS

CONTINUITY

This application is a continuation-in-part of copending U.S. patent application Ser. No. 09/397,590, filed Sep. 16, 1999, now abandoned, which is a division of U.S. patent application Ser. No. 09/226,533, filed Mar. 11, 1999, now U.S. Pat. No. 6,029,606, which is a division of U.S. patent application Ser. No. 09/059,898, filed Apr. 14, 1998, now U.S. Pat. No. 5,957,085.

FIELD OF THE INVENTION

The present invention relates generally to aquarium accessories and, more particularly, to the creation of an underwater air chamber for submerged access by amphibious life within the aquarium to permit the amphibious life to selectively leave a water environment for a dry environment.

BACKGROUND

Various types of amphibious life, such as crabs and newts prefer amphibious environments. Newts, for example, need to breath air and, when placed in conventional water aquariums, typically need to ascend to a top water surface every time they have need or desire to breath air. Similarly, some species of crabs desire to periodically leave an underwater environment for a dry environment to permit their shells to dry. It would be desirable to provide structures and methods which permit amphibious life within an underwater aquarium environment to selectively leave the water environment for a dry environment to dry off, breath, or both.

One conventional method of providing a dry refuge for amphibious life within an aquarium is to provide an island structure which extends above the top surface of the water within the aquarium. As amphibious life desires or needs to leave the water environment for a dry environment, the amphibious life may climb onto a top surface of the island to breathe, to dry off, or both. Unfortunately, such islands often substantially frustrate a primary purpose of aquariums, namely permitting individuals to observe closely the day-to-day activities of the amphibious life through the transparent sidewalls of an aquarium because of the height of the island. When the amphibious life is positioned on top of an island above the top surface of the water, the amphibious life cannot be easily seen through the transparent side walls of the aquarium.

Attempts have also been made to provide underwater air chambers positioned beneath the water top surface to permit amphibious life to be viewed while in a dry environment. These attempts, however, have been largely unsuccessful and have possessed certain limitations. For example, as an underwater chamber is lowered beneath the water top surface in the aquarium, buoyant forces act on the chamber which tend to cause the chamber to rise or to otherwise become unstable. To stabilize the chamber within the aquarium, the buoyant forces must be counteracted. The prior art has failed to provide a simple, cost-effective manner of counteracting the buoyant forces acting on an underwater air chamber.

An additional limitation associated with conventional underwater chambers is that they lack an ability to selectively control the respective amounts of air and water within the underwater chamber. For example, one prior art device includes a conventional pump which pumps air into various aquarium accessories, including an underwater air chamber. The pump delivers air at a constant rate and pressure to the various aquarium accessories which makes it difficult to control the amount of air or air pressure within the underwater air chamber without affecting the other aquarium accessories which receive air from the pump. Accordingly, there is a need to provide an underwater air chamber with an internal air pressure control which can be adjusted.

Conventional underwater air chambers also lack an ability to conveniently provide food for the amphibious life within the air chamber. It is both entertaining and educational to observe amphibious life eat. Moreover, some forms of amphibious life prefer to eat in a dry environment instead of an underwater environment. The prior art has failed to satisfactorily address the need for an underwater air chamber into which food for amphibious life may be conveniently provided.

An additional problem encountered by underwater air chambers of the past is the difficulty in luring amphibious life from the water environment into the dry environment. Accordingly, a need exists to provide a method of attracting amphibious life from a water environment into the dry environment.

Yet additional limitations of conventional underwater chambers are that they fail to adequately secure beach-forming material within the air chamber and they fail to provide an escape for debris from the underwater air chamber. As such, a yet additional need exists to provide an underwater air chamber which effectively retains beach-forming material within the air chamber and provides a method of removing unwanted debris from within the air chamber.

BRIEF SUMMARY AND OBJECTS OF THE INVENTION

In brief summary, the present invention overcomes or substantially alleviates prior art problems related to provision of an underwater observation air chamber which permits amphibious life to selectively leave a water environment for a dry environment. The present invention provides a hollow chamber submerged in a water environment with an entryway for permitting amphibious creatures to selectively leave a water environment for a dry environment within the chamber in easy view of human observers. The present invention also provides unique methodology for creating an underwater air chamber for amphibious life to selectively enter. Compact versions and swim-through versions of the invention are provided.

With the foregoing in mind, it is a primary object of the present invention to overcome or substantially alleviate problems associated with prior art underwater air chambers used, for example, in conventional aquariums.

Another significant object is the provision of a hollow observation chamber to be submerged in an aquarium having a novel water door for amphibious life.

Another object of importance is the provision of a gas effluent control associated with an underwater air chamber for an aquarium to selectively and adjustably release a gas under pressure from within the air chamber into the water environment of the aquarium.

A further paramount object is the provision of a novel food delivery apparatus and method by which food may be introduced from above the top surface of the water environment into an underwater air chamber for consumption by amphibious life within the air chamber.

It is an object of considerable value to provide unique methodology by which an underwater air chamber may be stabilized within an underwater environment, such that buoyant forces are overcome.

It is another dominant object of invention to provide a transparent underwater chamber secured within a conventional aquarium which periodically emits a large air bubble through an entryway to the air chamber for attracting amphibious life into the chamber.

It is yet another valuable object to provide an underwater air chamber which retains beach-forming material within the air chamber.

Another important object is the provision of compact underwater chambers, and related methods, for amphibious life.

A further object of significance is the provision of underwater chambers with a swim-through channel, for amphibious life, and related method.

These and other objects and features of the present invention will be apparent from the detailed description taken with the reference to the accompanying drawings.

BRIEF DESCRIPTION OF THE DRAWINGS

FIG. 4 is a front sectional view of the aquarium accessory of FIG. 1 positioned within a conventional aquarium with a feed tube;

FIG. 7 is a sectional perspective view of an L-shaped slot and pin assembly according to the present invention;

FIG. 8 is a sectional view of the L-shaped slot illustrated in FIG. 7 taken along the line 8—8;

FIG. 9 is a sectional view of the L-shaped slot and pin assembly illustrated in FIG. 7;

FIG. 10 is a sectional view of an anti-buoyancy structure according to the present invention;

FIG. 15 is a sectional view of an underwater air chamber base attached to a platform by suction cups in accordance with the principles of the present invention;

FIG. 16 is a sectional view of an underwater air chamber base attached to an aquarium by suction cups in accordance with the present invention;

FIG. 17 is a sectional view of an underwater air chamber attached to an aquarium by an adhesive;

FIG. 18 is a sectional view of an underwater air chamber attached to an aquarium wall by a suction cup according to the present invention;

FIG. 19 is a perspective view of another embodiment of an underwater air chamber formed in accordance with the present invention;

FIG. 21 is a perspective view of the base of the underwater air chamber of FIG. 19;

FIG. 22 is a fragmentary sectional view of the underwater air chamber of FIG. 19 illustrating a snap-fit attachment of the hood to the base;

FIG. 23 is a fragmentary sectional view of an alternate manner of securing a bio-chamber hood to a bio-chamber base by a snap-fit attachment;

FIG. 24 is a perspective view of another embodiment of a feeding device according to the present invention;

FIG. 25 is a perspective view of yet another embodiment of a feeding device according to the present invention;

FIG. 26 is an exploded perspective view of the feeding device of FIG. 25;

FIG. 27 is an exploded perspective view of a free-standing aquarium formed in accordance with the present invention;

FIG. 31 is an exploded perspective of a compact underwater bio-chamber for use in an aquarium;

DETAILED DESCRIPTION OF THE ILLUSTRATED EMBODIMENTS

Figure 1:
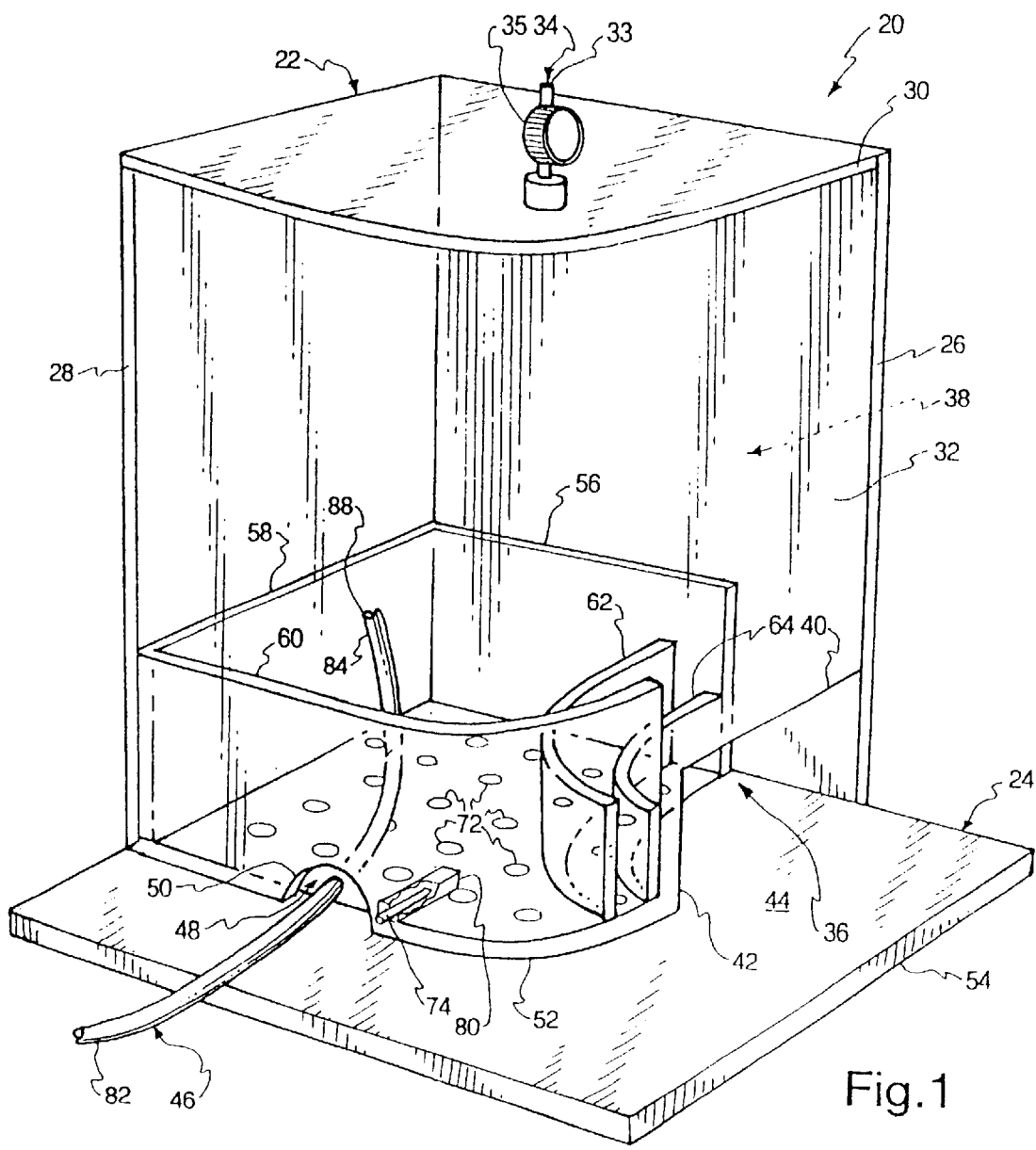
FIG. 1 is a perspective view of a bio-chamber aquarium accessory formed in accordance with the principles of the present invention.
Figure 2:
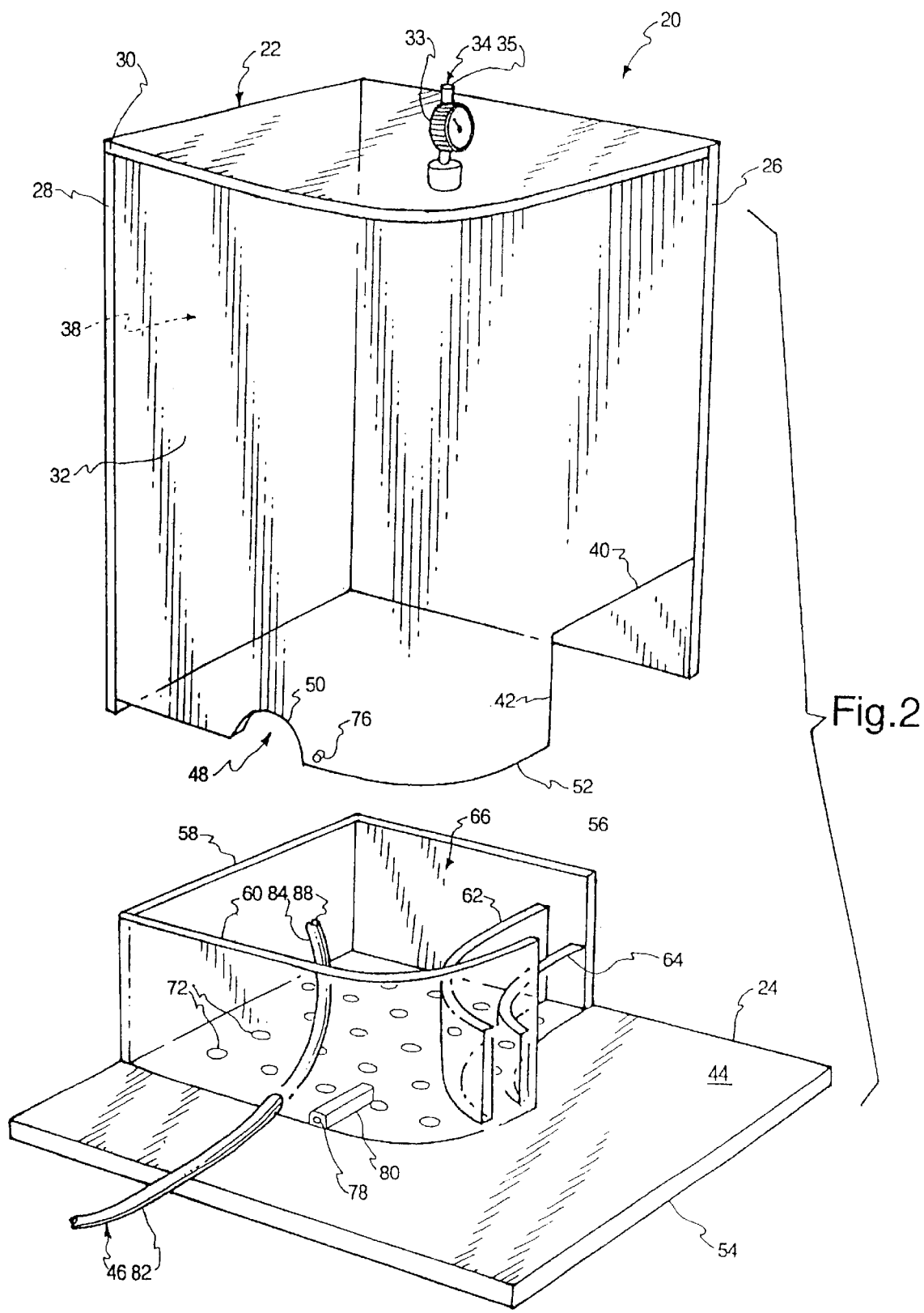
FIG. 2 is an exploded perspective view of the aquarium accessory of FIG. 1.
Figure 3:
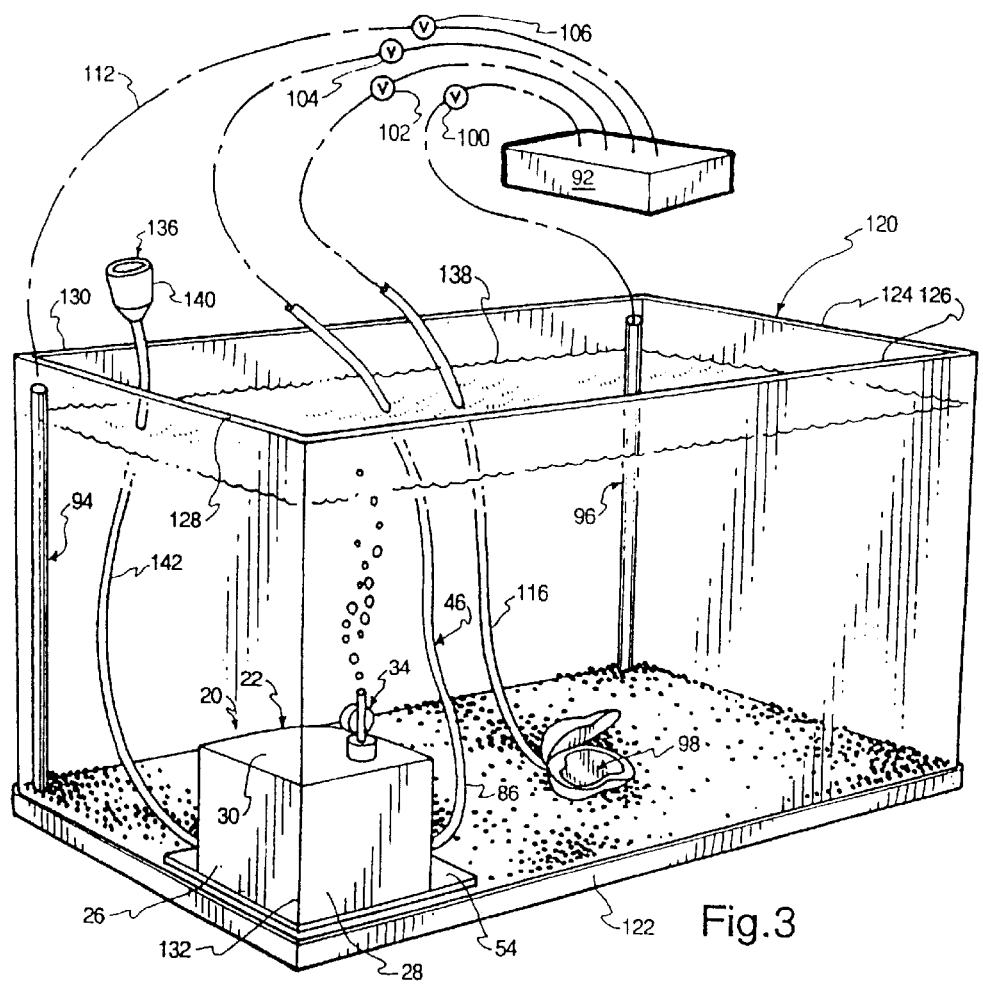
FIG. 3 is a perspective view of the aquarium accessory of FIG. 1 positioned within a conventional aquarium.
Figure 5:
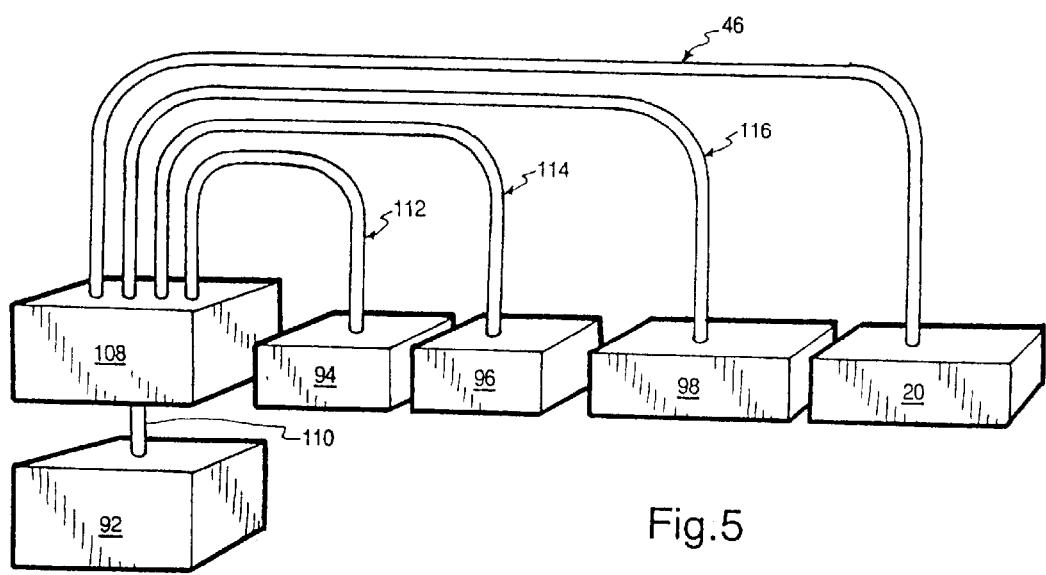
FIG. 5 is a schematic diagram illustrating a pressurized gas delivery system according to the principles of the present invention.
Figure 6:
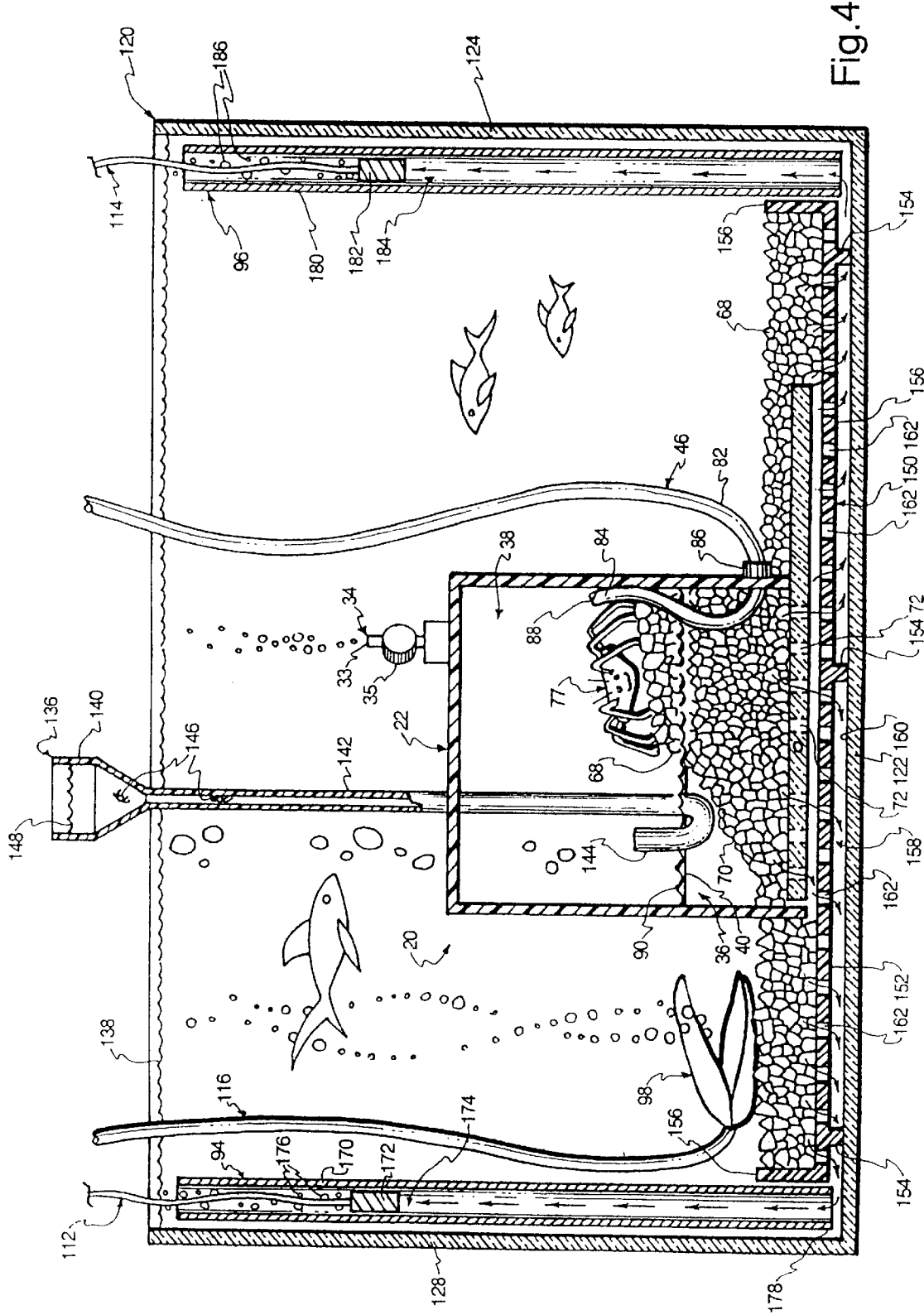
FIG. 6 is a sectional view of a pressurized gas connector configuration according to the present invention.
Figure 12:
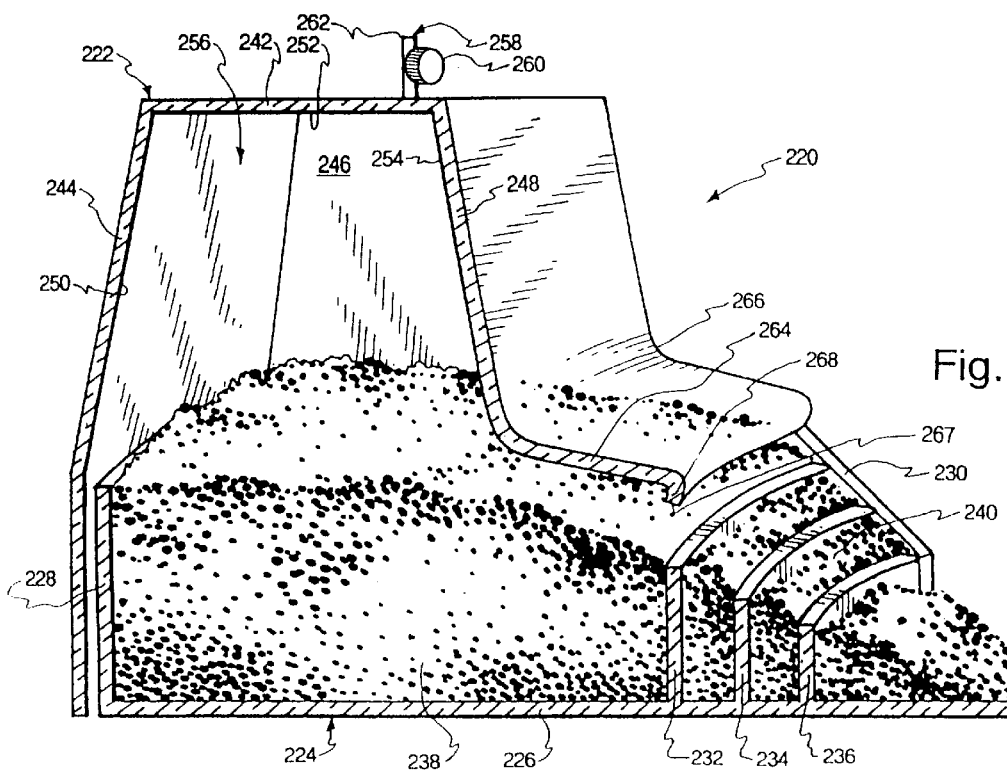
FIG. 12 is a perspective view of a yet additional alternate embodiment of an aquarium accessory according to the present invention.
Figure 11:
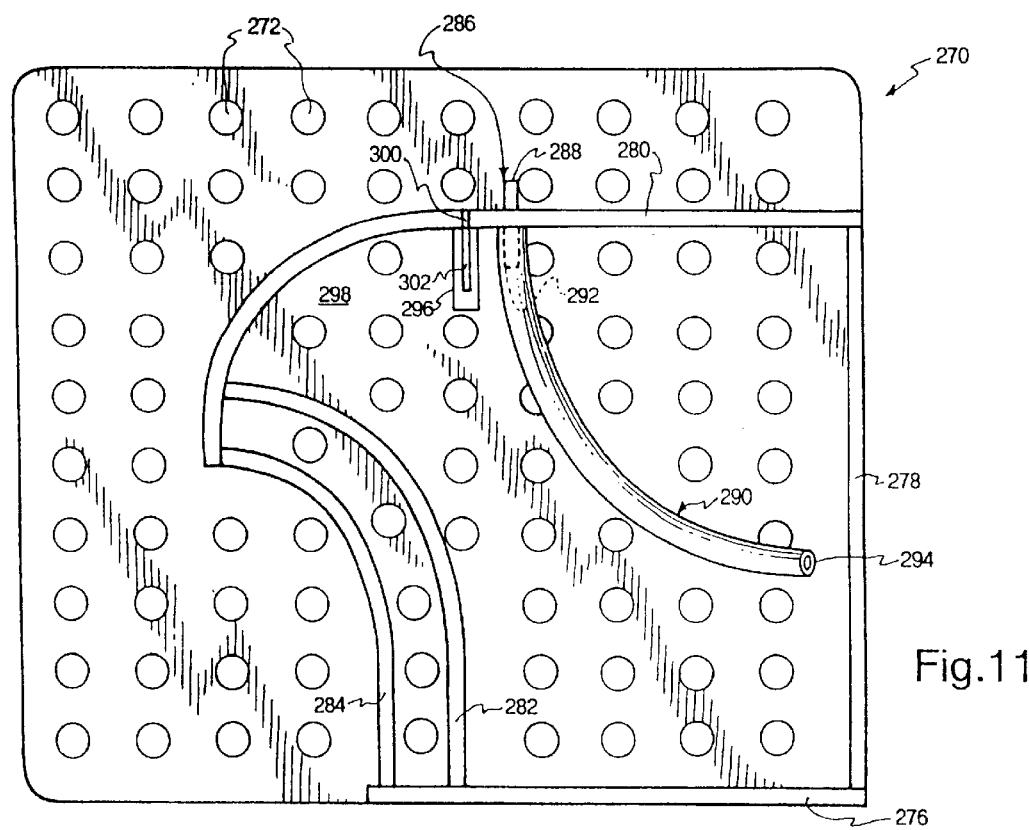
FIG. 11 is a top elevation view of another alternate embodiment of a base for an underwater chamber according to the principles of the present invention.
Figure 13:
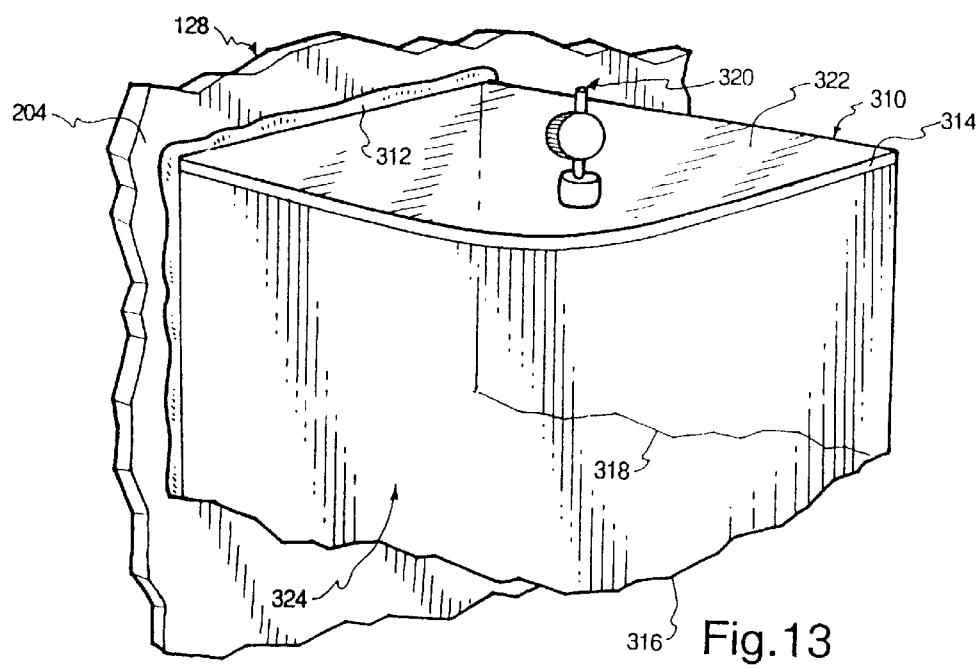
FIG. 13 is a sectional view of an underwater air chamber which employs an aquarium wall as a wall of the underwater air chamber.
Figure 14:
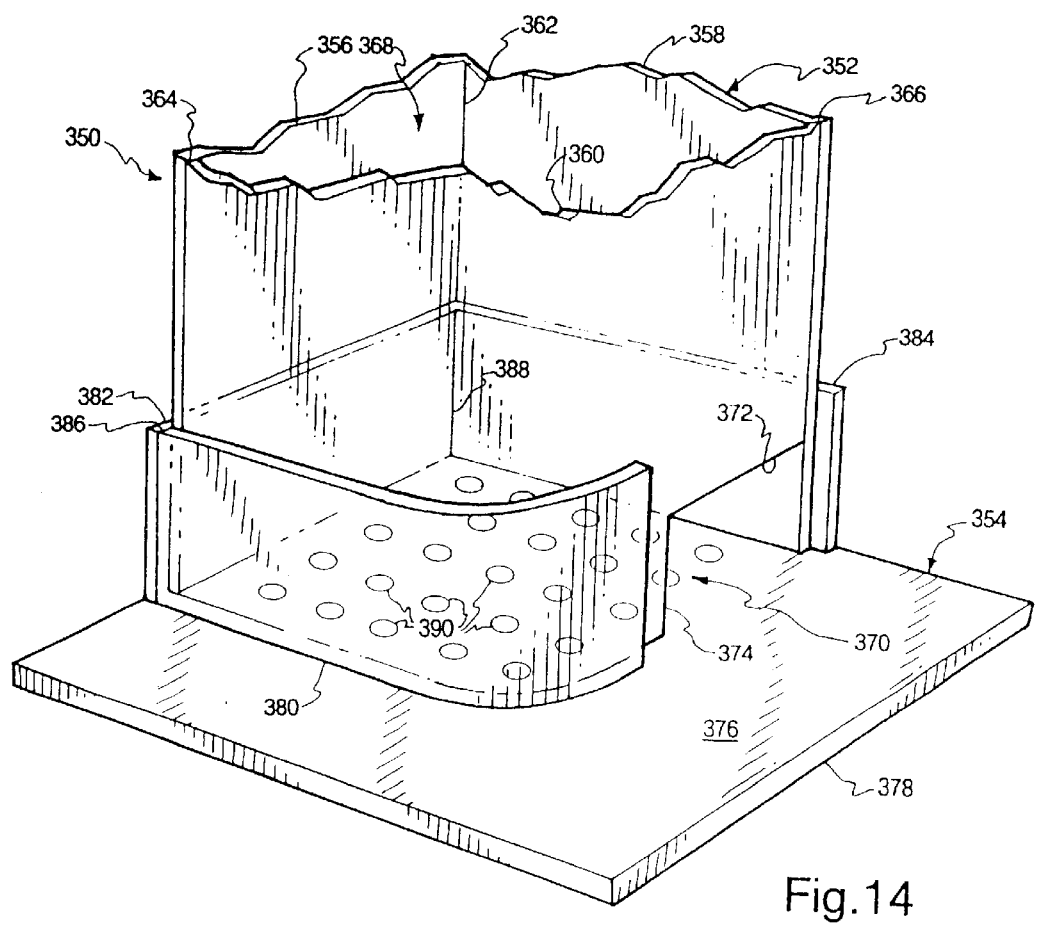
FIG. 14 is a sectional perspective view of yet another alternate embodiment of an underwater chamber according to the principles of the present invention.
Figure 28:
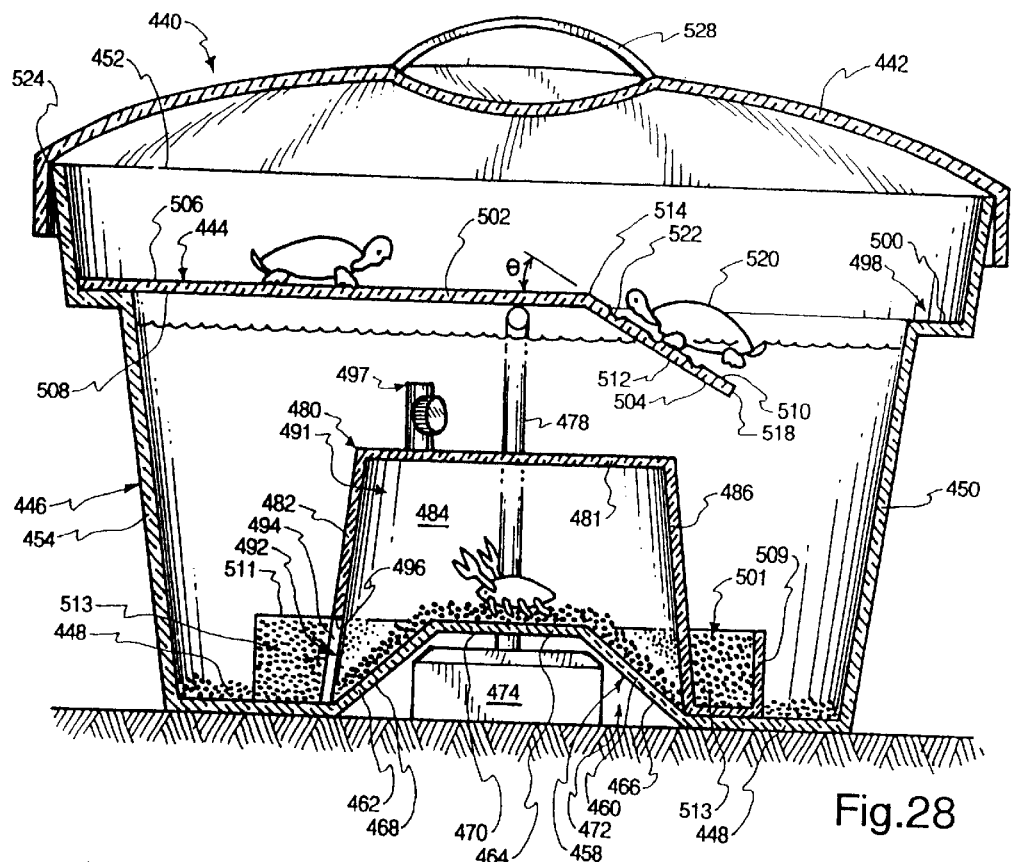
FIG. 28 is a sectional elevation view of the aquarium of FIG. 27 taken along the line 28—28.
Figure 30:
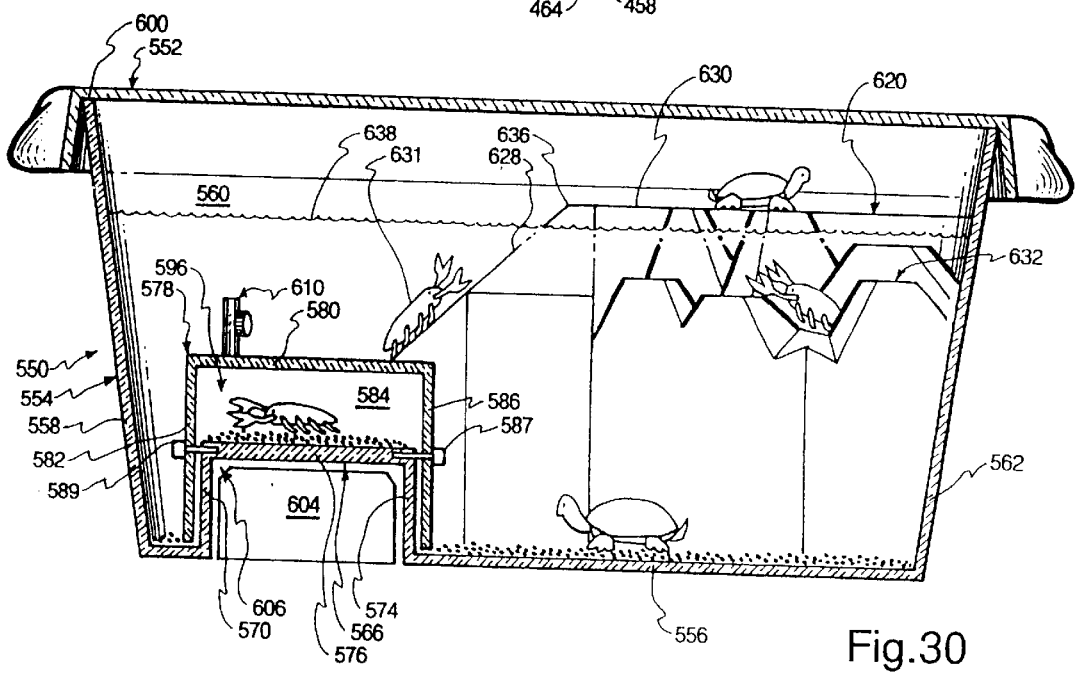
FIG. 30 is a sectional elevation view of the aquarium of FIG. 29 taken along the line 30—30.
Figure 29:
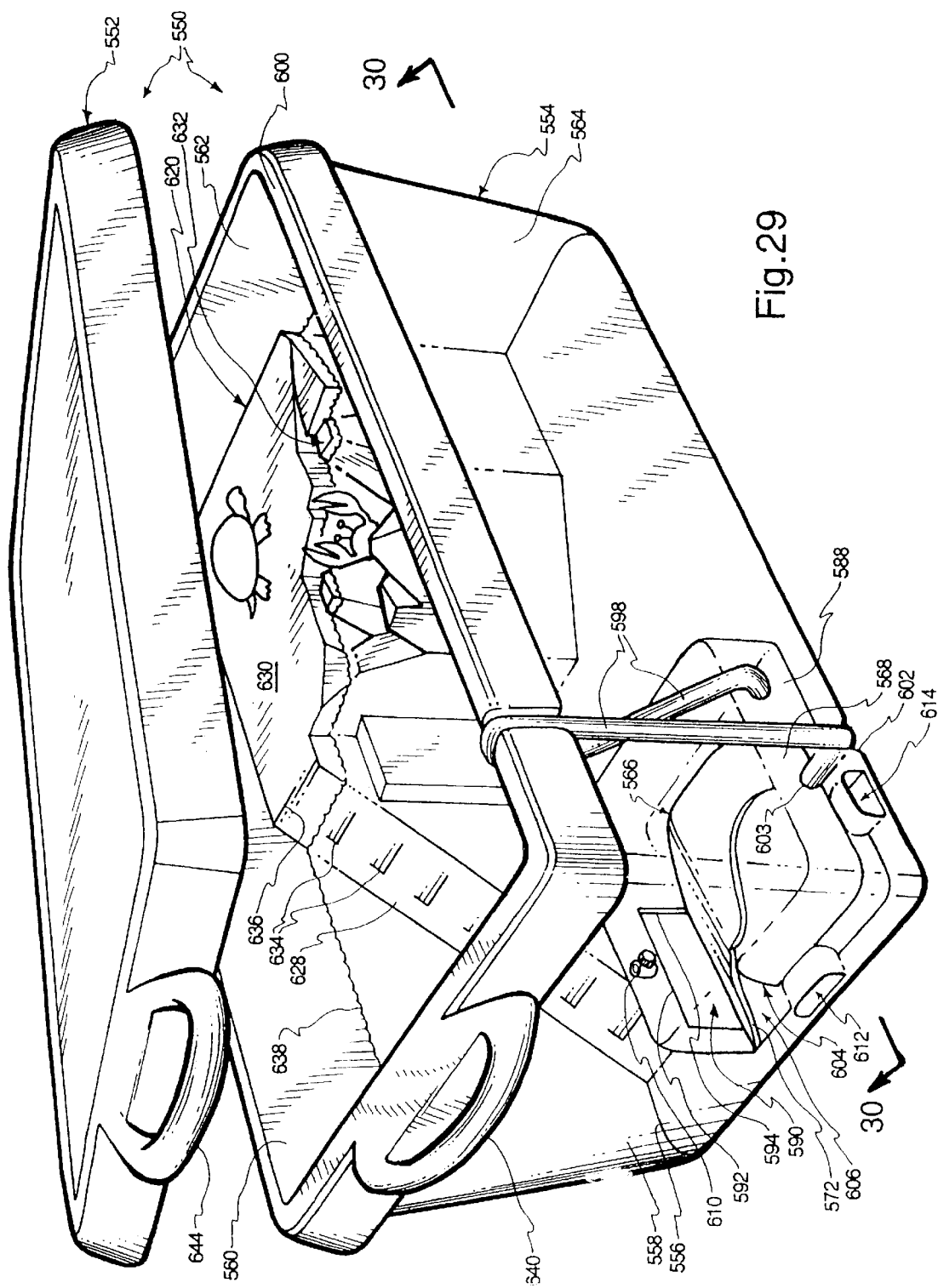
FIG. 29 is an exploded perspective view of an alternate embodiment of a free-standing aquarium formed in accordance with the present invention.

Reference is now made to the drawings wherein like numerals are used to designate like parts throughout. FIG. 1 illustrates a bio-chamber aquarium accessory according to the present invention. FIG. 2 illustrates, in an exploded view, an underwater air chamber aquarium accessory according to the present invention with the hood removed from the base. FIG. 3 illustrates an underwater air chamber aquarium accessory according to the present invention positioned within a conventional aquarium. FIG. 4 illustrates an underwater air chamber aquarium accessory according to the present invention with a feed tube. FIG. 5 illustrates a pressurized gas delivery system according to the present invention. FIG. 6 illustrates a pressurized gas connector according to the present invention. FIG. 7 illustrates an L-shaped slot and pin assembly according to the present invention. FIG. 8 illustrates an L-shaped slot according to the present invention. FIG. 9 illustrates an L-shaped slot and pin assembly according to the present invention. FIG. 10 fragmentarily illustrates an anti-buoyancy structure according to the present invention. FIG. 11 illustrates a base for an underwater chamber according to the principles of the present invention. FIG. 12 illustrates an underwater air chamber aquarium accessory having an extended entryway according to the present invention. FIG. 13 illustrates an underwater air chamber aquarium accessory which employs an aquarium wall as a wall of the underwater air chamber. FIG. 14 illustrates an underwater air chamber aquarium accessory according to the present invention where the hood fits inside the base structure. FIG. 15 illustrates an underwater air chamber base secured to a platform by suction cups in accordance with the present invention. FIG. 16 illustrates an underwater air chamber secured to a bottom surface of an aquarium by suction cups in accordance with the present invention. FIG. 17 illustrates an underwater air chamber attached to an aquarium by an adhesive. FIG. 18 illustrates an underwater air chamber attached to an aquarium wall by a suction cup. FIG. 21 is a perspective view of a base of the underwater air chamber illustrated in FIG. 19. FIG. 22 is a fragmentary sectional view of the underwater air chamber of FIG. 19 showing the snap-fit attachment of the hood to the base. FIG. 23 shows an alternate manner of securing a bio-chamber hood to a base portion. FIG. 24 shows, in a perspective view, another embodiment of a feeding device which may be hung from an aquarium side wall. FIG. 25 illustrates in a perspective view yet another embodiment of a feeding device according to the present invention. FIG. 26 illustrates, in an exploded perspective view, the feeding device of FIG. 25. FIG. 27 shows a free-standing aquarium formed in accordance with the present invention. FIG. 28 shows the free-standing aquarium of FIG. 27 in cross-section. FIG. 29 illustrates an alternate embodiment of a free-standing aquarium in accordance with the present invention. FIG. 30 shows the free-standing aquarium of FIG. 29 in cross-section.

FIGS. 1 through 4 illustrate one embodiment of a hollow bio-chamber or underwater air chamber aquarium accessory 20 formed in accordance with the present invention. As shown, the underwater air chamber 20 generally comprises a cover or hood 22 and a base 24. The hood 22 is shown as further comprising vertically directed side walls 26 and 28, a top wall 30, and a curved front wall 32. A water door or entryway 36 into the hollow chamber 38 is defined by edges 40 and 42 of the hood and a top surface 44 of a base plate 54.

The size and shape of the entryway 36 enables surface tension to resist gas discharge through the entryway 36. Thus, gas as discussed in more detail below, discharge through the entryway is limited to the periodic emission of large, discontinuous bubbles and depends on the magnitude of gas pressure within the hood. By passing large, continuous bubbles from time-to-time through the entryway 36 into the volume of water surrounding the bio-chamber, amphibious creatures may be attracted to the chamber entryway 36.

To permit the contents of the chamber interior 38 to be viewed from outside the chamber interior 38, the walls 26, 28, 30 and 32 of the hood 22 are advantageously formed of a transparent material. Preferably the hood 22 is formed of a lightweight, transparent, thermoplastic synthetic resin such as that sold under the trademark "PLEXIGLAS." Other suitable transparent materials may also be effectively employed.

Additionally, to permit a gas tube 46 to be coupled with the hollow interior 38, a U-shaped opening 48 is formed in the front wall 32 of the hood 22. The U-shaped opening is defined by a U-shaped edge 50 formed in the hood front wall 32.

A gas effluent control such as an adjustable valve 34 is shown as being mounted on the top wall 30 of the hood 22. The valve 34 is shown as generally comprising an adjustment knob 35 for metering the release of gas from within the hollow chamber 38 through a gas effluent end 33. As discussed in more detail below, pressurized gas, such as compressed air or oxygen, is provided into the hollow chamber 38 to displace water within the chamber to create a dry, air environment underwater for amphibious life to selectively enter. The adjustable valve 34 controlledly meters a release of gas from within the chamber 38 into the water surrounding the aquarium accessory 20. Alternatively, an elongated tube (not shown) may be interposed between the hollow chamber 38 and the valve 34 so that the valve 34 is positioned above the water top surface 138. With the valve 34 positioned above the water surface 138, any pressurized gas passing through the valve 34 would not be released into the water surrounding the bio-chamber 20, but could, instead, be released directly into the atmosphere. By this manner, the respective amounts of pressurized gas and water within the hollow chamber 38 can be controlled by adjusting the valve 34 and without having to adjust the rate or pressure of the pressurized gas being continuously introduced into the chamber 38.

The base 24 is further illustrated as generally comprising the base plate 54 and vertically-directed side walls 56, 58, and 60 mounted on the base plate top surface 44. Vertically-directed retaining walls 62 and 64 are also mounted on the top surface 44 of the base plate 54. As shown, the vertically-directed side walls 56, 58, and 60 are mounted on the top surface 44 of the base plate 54. As shown in FIG. 2, the walls 56, 58, and 60 are oriented to form a chamber 66 for retaining dock-forming material in place on the base plate 54.

The retaining walls 62 and 64 are illustrated as comprising vertically-directed curved walls securely mounted on the top surface 44 of the base plate 54 and are helpful in retaining a dock-forming material 68 within the chamber 66 defined by the walls 56, 58, and 60. The dock-forming material 68 may advantageously comprise inert aggregate particles, such as gravel. The dock-forming material generally comprises a beach within the chamber. The retaining wall 62 is illustrated in FIGS. 1 and 2 as having a greater vertical dimension than the retaining wall 64 so that the two retaining walls are capable of supporting different heights of the beach-forming material. Because the retaining walls 62 and 64 comprise different vertical dimensions, when the dock-forming material is positioned about the retaining walls 62 and 64, the retaining walls help to define a tapered ramp 70 (FIG. 4). The tapered ramp 70 provides an inclined surface for an amphibious creature 71 to enter and exit the chamber 38. As shown, the retaining walls 62 and 64 are formed adjacent to the entryway for securing the dock-forming material in place.

A plurality of apertures 72 are formed in the base plate 54. As discussed in more detail below, the apertures 72 formed through the base plate 54 permit debris to pass out of the chamber 38. By permitting debris to pass through the apertures 72, the bio-chamber 20 can be continually cleaned without the need to frequently remove the bio-chamber 20 from the aquarium. Further, this manner of removing debris from within the chamber also avoids the need to disassemble the bio-chamber 20 for cleaning purposes.

As illustrated in FIGS. 1 and 2, the hood 22 is secured to the base 24 by passing a pin 74 through an aperture 76 formed in the front wall 32 of the hood 22. The pin 74 is further advanced into a bore 78 formed in a block 80. The block 80 is rigidly secured to the top surface 44 of the base plate 54. In this manner, the hood 22 is releasibly secured to the base 40 such that inadvertent separation of the hood 22 and the base 24 is prevented.

The tube 46 serves as a gas flow path structure for providing a gas, such as air or oxygen, under pressure to the chamber interior 38. The tube 46 is shown in FIGS. 1 and 2 as being connected to the base 24 through the wall 60. Specifically, the gas flow path structure 46 comprises a supply tube 82, and a discharge tube 84 coupled in fluid communication by a connector 86 (FIG. 6) mounted with the vertical wall 60. As illustrated in FIG. 4, the discharge tube 84 further comprises a discharge end 88 which is preferably located within the gas contained within the chamber 38 and above a water line 90 in the chamber 38. By delivering the gas under pressure above the water line 90 within the chamber 38, bubbling within the chamber is substantially avoided. Bubbling within the chamber 38 tends to create water vapor and thus inhibits visibility within the chamber 38.

FIG. 6 illustrates the connector 86 mounted within the wall 60 of the base 24. The connector 86 extends through an aperture in the wall 32 to permit the tube 82 to be connected to a proximal end 85 of the connector 86. Likewise, a discharge tube 84 may be secured to the distal end 87 of the connector 86 to permit pressurized gas to be delivered into the bio-chamber 20.

As shown in FIGS. 3 and 5, a conventional air pump 92 may be used to supply pressurized gas to the gas flow path structure 46. The pump 92 may also be effectively used to provide pressured gas to other aquarium accessories, such as to stand pipes 94 and 96, and to other bubbling accessories, such as a clam 98. The pressurized gas may comprise compressed air or compressed oxygen.

The pump 92 may supply the various aquarium accessories with pressurized gas through individual valves 100, 102, 104, and 106 as illustrated in FIG. 3. Alternatively, as shown in FIG. 5, the pump 92 may provide pressured gas to a gang valve 108 through a conduit 110 so that the gang valve 108, in turn, can provide pressurized gas to the stand pipes 94 and 96, the aquarium accessory 98, and the underwater air chamber 20. The stand pipes 94 and 96 are illustrated as receiving pressured gas through conduits 112 and 114 while the aquarium accessory 98 receives pressurized gas through conduit 160. As discussed above, the underwater air chamber aquarium accessory 20 receives pressured gas via the gas flow path structure 46.

FIG. 3 illustrates the underwater air chamber aquarium accessory 20 positioned within a conventional water aquarium 120. The aquarium 120 is shown as generally comprising a bottom wall 122 peripherally bounded by upstanding side walls 124, 126, 128, and 130. Conventionally, the upstanding side walls are vertically-directed and are formed of a transparent material, such as glass. As shown in FIG. 3, the underwater air chamber aquarium accessory 20 may be positioned adjacent to the aquarium corner 132 formed between the aquarium walls 128 and 126. In the orientation illustrated in FIG. 3, the wall 26 of the hood 22 is aligned in a substantially parallel relationship with the transparent side wall 128 of the aquarium 120. Likewise, the vertical wall 28 of the hood 22 is also positioned in a substantially parallel relationship with the transparent wall 126 of the aquarium 120. By positioning the walls 26 and 28 of the underwater air chamber 20 in a substantially parallel fashion with the walls of the aquarium, any glare or other reflection from the underwater air chamber 20 is avoided so that the view of the amphibious life within the air chamber is enhanced.

FIGS. 3 and 4 also illustrate one embodiment of a food influent device, namely feed tube 136 for introducing food into the air chamber 38 from above a water line 138 of the aquarium. The feed tube 136 is illustrated as generally comprising, seriatim, an enlarged funnel-shaped effluent end 140, a reduced sized tube 142, and a hook-shaped hollow distal end 144 (FIG. 4). As shown in FIGS. 3 and 4, the enlarged funnel-shaped effluent end 140 is positioned above the water line 138 to permit food, such as an insect 146 and carrier water 148 to be introduced into the feed tube above the water line 138 of the aquarium 120. As mentioned above, the reduced sized tube 142 interconnects the enlarged funnel-shaped effluent end 140 with the hook-shaped hollow distal end 144. The reduced size tube 142 comprises a tube in fluid communication with the hood-shaped distal end 144 and the funnel-shaped effluent end 140. While the hook-shaped distal end 144 is shown in FIG. 4 as being formed as one piece with the reduced size tube 142 and the funnel-shaped effluent end 140, the sections 140, 142, and 144 may also comprise separate pieces secured together in series. The hook-shape of the distal end 144 allows food, such as the insect 146, for the amphibious creature 71 to be passed, with carrier water 148, to pass from a position above the water line 138 of the aquarium into the hollow interior 38 of the underwater air chamber 20 through the entryway 36 for consumption by the creature 71.

As illustrated in FIG. 4, the underwater air chamber aquarium accessory 20 may be placed within a conventional aquarium 120 on top of a previous platform 150 supported by and generally spaced above the bottom wall 122 of the aquarium 120. The previous platform 150 is shown as comprising a base 152 supported by a plurality of legs 154 with side walls 156 and 158 extending vertically from the base 152. The legs 154 are formed on a bottom surface 156 of the base 152 to maintain a space 158 between the bottom surface 156 of the base 152 and the top surface 160 of the aquarium floor 122. A plurality of apertures 162 are formed in the base 152 to accommodate displacement of debris through the previous platform 150. The side walls 156 and 158 assist in retaining a quantity of aggregate material 68 on the platform 150.

Stand pipes 94 and 96 are provided to assist in the removal of debris from within the underwater air chamber aquarium accessory 20 and from within the aquarium 120 generally. As illustrated in FIG. 4, the stand pipe 94 generally comprises an elongated hollow tube 170, a pressurized gas conduit 112, and a pumice block 172. The pumice block 172 is positioned within the hollow interior 174 of the stand pipe 94 and receives a supply of pressurized gas from the pressurized gas conduit 112 which is coupled to the pumice block. The pressurized gas is released from the pumice block in the form of bubbles 176.

The upward movement of the bubbles 176 through the stand pipe 94 creates an upward-directed flow of water through the stand pipe 94. As such, water and debris located in proximity with a bottom end 178 of the stand pipe 94 are drawn toward and into the bottom end 178 of the stand pipe 94. This drawing of water and debris also tends to pull debris from within the aggregate material 68 through the apertures 162 formed in the platform 150 and through the apertures 72 formed in the base 24 of the underwater chamber aquarium accessory 20. Thus, in this manner, debris located within the aggregate material 68 is continuously removed from within the aggregate material by the drawing influence of the stand pipes 94 and 96.

The stand pipe 96 is configured and operates in the same manner as the stand pipe 94. Specifically, the stand pipe 96 generally comprises an elongated tube 180, a pumice block 182, a tube interior 184, and bubbles 186. The tube 180, the pumice block 182, and the pressurized gas conduit 114 are identical to the elongated tube 170, pumice block 172 and the pressurized gas conduit 112 of the stand pipe 94 and described above. While the aquarium 120 illustrated in FIG. 4 is shown as comprising two stand pipes, it is to be appreciated that more or fewer stand pipes could also be effectively employed.

As the underwater air chamber aquarium accessory 20 is submerged underwater as illustrated in FIGS. 3 and 4, the aquarium accessory 20 is acted upon by buoyant forces which, if not effectively counteracted, tend to cause the aquarium accessory 20 to float, to become otherwise unstable, or both. One manner in which inadvertent displacement may be avoided and the buoyant forces acting on the aquarium accessory 20 may be effectively counteracted is by positioning a weight, such as the aggregate particles 68, within the air chamber 38 and on top of the base plate 54 both within and without the air chamber 38. Advantageously, sufficient aggregate material 68 is positioned on the base plate 54 so that the weight of the aggregate material 68 completely counteracts the buoyant forces acting on the aquarium accessory to generally stabilize the aquarium accessory 20 within the aquarium 120.

FIGS. 7 through 9 illustrate an additional manner of releasibly interconnecting the hood portion 22 to the base portion 24 of the bio-sphere 20. As shown, the L-shaped slot 49 generally comprises a tapered portion 51 and intermediate throat 53, and a horizontal portion 55. The tapered portion 51 is defined by angled edges 57 and 59. Similarly, the intermediate throat portion 53 is defined by vertical edges 61 and 63. The vertical edge 61 is illustrated as intersecting the angled edge 51 at a corner 65. The horizontal portion 55 is defined by a top horizontal edge 67 and a bottom horizontal edge 69. The horizontal portion terminates at transverse edge 71.

The pin 73 is sized to fit within the L-shaped slot 49 and generally comprises an annular exterior surface 75 and is mounted on an interior surface 77 on the wall 60. As shown, the pin exterior surface 75 has a diameter smaller than the width of the slot 49 at the intermediate portion 53 to permit the pin 73 to be slid through the tapered portion 51 and the intermediate portion 53 into the horizontal portion 55. FIG. 9 illustrates the wall 60 releasibly interlocked with the wall 32 by the pin 73 being interlocked with the L-shaped slot 49.

FIG. 10 illustrates an additional manner of counteracting buoyant forces acting on the bio-chamber 20 as the bio-chamber 20 is submerged within an aquarium. In the embodiment, a tab 129 is illustrated as being rigidly affixed to the inside surface 131 of the aquarium wall 128. The tab 129 is shown as comprising a top surface 133, a bottom surface 135 and a transverse edge 137. A top surface 31 of the bio-chamber top wall 30 is illustrated as being positioned adjacent to the tab bottom surface 135 beneath the tab 129. Further, the bio-chamber side wall 28 is shown as being oriented adjacent to and substantially parallel with the inside surface 131 of the aquarium wall 128.

In the configuration illustrated in FIG. 10, any upwardly-directed vertical buoyant forces acting on the bio-chamber 20 are counteracted by the tab 129. Thus, to the extent the hood top wall 30 is forced in an upward direction due to buoyant or other forces, such vertically-directed forces are counteracted and opposed by the tab 129, to substantially stabilize the bio-chamber 20 in a submerged state within a conventional aquarium.

FIG. 11 illustrates a top plan view of a base 270 for an underwater air chamber aquarium accessory. The base 270 is generally configured in a manner similar to the base 24 illustrated in FIGS. 1 and 2, with the primary difference being the arrangement of the apertures 272. Generally, the base 270 comprises vertical walls 276, 278, and 280. The walls 276, 278, and 280 are configured and function in a manner identical to the walls 56, 58, and 60 respectively described above and illustrated in FIGS. 1 and 2. The base 270 further comprises two retaining walls 282 and 284, which are oriented and configured in a manner identical to that of the retaining walls 62 and 64 respectively, as described above and as illustrated in FIGS. 1 and 2.

Additionally, a connector 286 is secured within the wall 280 to permit a pressurized gas conduit to be attached to a proximal end 288 of the connector 286 and a internal tube 290 to be coupled to distal end 292 of the connector 286. As shown, the tube 290 also comprises a discharge end 294 for discharging gas under pressure into an underwater air chamber. Preferably, the discharge end 294 is positioned above the water line to avoid bubbling within the underwater air chamber. Bubbling within the underwater air chamber tends to create unwanted water vapor, which, in turn, tends to hinder visibility within the underwater air chamber.

A block 296 is securely attached to a top surface 298 of the base to assist in securing the hood 22 (FIG. 2) to the base 270. As shown, an aperture 300 formed in the side wall 280 is aligned with a bore 302 formed longitudinally in the block 296. When the aperture 300 and the bore 302 are aligned with the aperture 76 formed in the hood front wall 32 (FIG. 2), the hood 22 and the base 270 may be secured together by passing a pin through the aperture 76, the aperture 300 and the bore 302.

FIG. 12 shows a yet additional embodiment of underwater air chamber aquarium accessory according to the present invention. As shown in FIG. 12, an underwater air chamber aquarium accessory 220 generally comprises a hood 222 and a base 224. The base 224 further comprises a base plate 226, a rear wall 228, side wall 230 and retaining walls 232, 234 and 236. As shown, a quantity of dock-forming material 238 is secured on the base plate 226 between and adjacent to the walls 228, 230, 232, 234 and 236. The dock-forming material 238 may comprise an inert aggregate material, such as gravel. The dock-forming material 238 provides a surface onto which an amphibious creature may climb within the underwater air chamber aquarium accessory 220.

The retaining walls 232, 234 and 236 are illustrated in FIG. 12 as having different vertical dimensions. Specifically, the front vertical wall 236 has a smaller vertical dimension than the intermediate retaining wall 234, which in turn, has a smaller vertical dimension than the rear retaining wall 232. In this configuration, the retaining walls 232, 234 and 236 are capable of retaining the dock-forming material 238 in such a manner than an inclined ramp surface 240 is formed across the retaining walls 232, 234 and 236 to permit an amphibious creature to rise vertically as the creature climbs into the underwater air chamber aquarium accessory 220 on the ramp surface 240.

The base 224 is covered, in large part, by the hood 222. As shown, the hood 222 generally comprises a top wall 242 and side walls 244, 246, and 248. The inside surfaces 250, 252, and 254, together with the wall 246, substantially define a hollow chamber 256. The walls 224, 242, 246 and 248 are advantageously formed of a transparent material, such as the lightweight, transparent thermoplastic synthetic resinous material sold under the trademark "PLEXIGLAS," to permit the contents of the chamber 256 to be seen from outside the underwater air chamber aquarium accessory 220.

A gas effluent control, such as a valve 258, is mounted on the hood top wall 242 in fluid communication with the hollow chamber 256 for selectively releasing gas under pressure from within the chamber 256. The valve 258 generally comprises an adjustment knob 260 and a gas effluent end 262. By adjusting the knob 260, the gas pressure within the chamber 256 as well as the flow of gas through the valve 258 may be controlled. By controlling the gas pressure within the chamber 256, the respective amounts of air and water within the air chamber 256 may be controlled.

The front wall 248 of the underwater air chamber aquarium accessory 220 has an entryway extension 264 formed thereon. The entryway extension 264 extends from the bottom 266 of the front wall 248 and terminates with a transverse edge 267 of a downwardly-directed flange 268. The front extension 264 defines an extended covered entryway into the chamber interior 256. Advantageously, the level of water within the chamber 256 is maintained just above the height of the edge 267.

FIG. 13 illustrates a yet additional embodiment of the present invention. This embodiment illustrates a hood 310 rigidly affixed to an inside surface 204 of the aquarium wall 128 by an adhesive 312. The hood 310 is shown as generally comprising a top plate 314, a front plate 316, and a rear plate 318. A valve 320 is mounted on a top surface 322 of the top plate 314. The valve 320 is configured and functions in the same manner as the valve 34 illustrated in FIGS. 1 and 2 and described above.

The front wall 316, the rear wall 318, and the top wall 314 are adhered to the inside surface 204 of the aquarium wall 128 by the adhesive 312. In this configuration, the inside surface 204 of the aquarium wall 128 forms a part of and helps define a hollow interior 324 of the hood 310. Thus, in this embodiment, the hollow interior 324 is defined by the front wall 316, the rear wall 318, the top wall 314, and the aquarium wall 128.

FIG. 14 illustrates still another alternate embodiment of a underwater air chamber aquarium accessory according to the present invention. The aquarium accessory 350 is shown as comprising a hood 352 and a base 354. In this embodiment, the hood 352 generally comprises a rear wall 356, a side wall 358, and a curved front wall 360. The walls 358 and 360 intersect at a corner 362. Similarly, the front wall 360 intersects the walls 356 and 358 at corners 364 and 366 respectively. To permit amphibious creatures to enter and exit a hollow interior 368 defined by the walls 356, 358 and 360, an entryway 370 is formed in the front wall 360. The entryway 360 is defined by a top edge 372 and a side edge 374 formed in the front wall 360. The entryway 370 is further defined by a top surface 376 of the base plate 378.

The base 354 is illustrated in FIG. 14 as generally comprising a base plate 358 and side walls 380, 382, and 384. As shown, the outside dimensions of the hood 352 are sized such that the hood 352 fits within the vertical walls 380, 382 and 384 of the base 354. The side walls 380, 382, and 384 are shown as being oriented substantially perpendicular to the top surface 356 of the base plate 378. The vertical wall 380 is illustrated as comprising a curved wall which is attached to the vertical wall 382 along edge 386. The wall 384 is shown as being oriented perpendicularly with the wall 382 and intersects the wall 382 along an edge 388. A plurality of apertures 390 are formed in the base plate 378 to permit unwanted debris to pass out of the chamber 368.

FIGS. 15 through 18 illustrate alternative or additional structures and methods for securing the aquarium accessory 20 within an aquarium and for counteracting buoyant forces acting on the aquarium accessory 20. The structures and methods illustrated and described in connection with FIGS. 15 through 18 may be used independently or in combination with the imposition of weights, such as the aggregate 68 on the aquarium accessory 20.

As illustrated in FIG. 15, the base plate 54 may be attached to a top surface 151 of the platform 150 by suction cups 190. Each suction cup 190 is shown as being attached to a bottom surface 192 of the base plate 54 at a suction cup top end 194. A suction cup bottom end 196 is removably attached to the top surface 151 of the platform 150. The suction cups 190 are attached to the platform by firmly pressing the suction cups against the platform to create a vacuum within the suctions cups 192. In this manner, the base plate 54, and thus the underwater air chamber aquarium accessory 20 may be secured and stabilized within the aquarium 120 and the associated buoyant forces acting on the aquarium accessory 20 may be effectively counteracted.

FIG. 16 illustrates the base plate 54 removably attached to the aquarium bottom wall 122 by suction cups 190. As discussed above in connection with FIG. 15, each suction cup 190 is securely attached to the bottom surface 192 of the base 54 at the upper end 194 of the suction cup 190. The bottom end 196 of each suction cup 190 is releasibly secured to the top surface 160 of the aquarium bottom wall 122. In the configuration illustrated in FIG. 16, a space 198 is maintained between the bottom plate 54 underwater air chamber aquarium accessory 20 and the bottom wall 122 of the aquarium 120. Thus, by attaching the base plate 54 to the aquarium bottom wall 122 by suction cups 190, the buoyant forces acting on the underwater air chamber 20 are counteracted and the aquarium accessory 20 is substantially stabilized. While FIG. 16 illustrates the base being secured to the bottom wall 122 by two suction cups 190, it is to be understood that different numbers of suction cups could also be effectively employed.

FIG. 17 illustrates a yet additional manner of securing the underwater air chamber 20 within a conventional aquarium 120. In this embodiment, the side wall 26 of the hood 22 is adhered by an adhesive 200 to the wall 128 of the aquarium 120 to counteract buoyant forces and to generally stabilize the underwater air chamber aquarium. Specifically, the exterior surface 202 of the wall 26 is adhered by the adhesive 200 to an inside surface 204 of the aquarium wall 128. By adhering the wall 26 to the wall 28, the underwater air chamber aquarium accessory 20 is substantially stabilized within the aquarium 120 and any buoyant forces acting on the aquarium accessory 20 are substantially counteracted.

As illustrated in FIG. 18, the side wall 26 of the hood 122 may also be secured to the side wall 128 of the aquarium 120 by a connector, such as a suction cup 206. Specifically, a proximal end 208 of the suction cup 206 is securely attached to the exterior surface 202 of the wall 26. A distal end 210 of the suction cup 206 is releasibly attached to the inside surface 204 of the aquarium wall 128. Advantageously, a plurality of suction cups are attached to the walls of the hood 22 to secure the hood 22 to the inside surfaces of the aquarium 120 by suction cups.

FIGS. 19, 20, 21, and 22 illustrate a yet additional embodiment of an underwater air chamber or bio-chamber according to the present invention. This embodiment shows an underwater air chamber or bio-chamber 210 which may be submerged within a conventional water aquarium to provide an underwater refuge for permitting submerged amphibious life to selectively leave a water environment for an air environment. The bio-chamber 210 is shown as generally comprising a hood 212 and a base 214, which may be releasibly attached to each other to create an underwater air chamber.

The base 214 is shown as comprising a bottom wall 216 peripherally bounded by vertically-directed outside walls 218, 220, 222, and 224. Additionally, two L-shaped inside walls 226 and 228 are shown as being perpendicularly mounted on the base bottom wall 216. The L-shaped inside wall 226 is shown as further comprising inside rear walls 230 and 232. As shown in FIG. 21, the rear walls 230 and 232 are oriented substantially perpendicularly to one another and are joined at a curved intersection 234. Likewise, the L-shaped inside wall 228 comprises inside front walls 236 and 238. The front walls 236 and 238 are also shown as being substantially perpendicularly oriented to each other and intersect at a curved intersection 240.

The rear wall 232 and the outside wall 220 are joined by an angled wall 242. Similarly, the outside wall 218 is joined with the rear wall 230 by an angled wall 244. In a similar manner, the L-shaped inside wall 228 is interconnected with the outside walls 222 and 224 by angled walls 246 and 248 respectively. Specifically, the front wall 238 is joined with the outside wall 224 by the angled wall 248. The outside wall 222 is likewise joined with the front wall 236 by the angled wall 246. The outside walls 218 and 220 together with the L-shaped inside wall 226 and angled walls 242 and 244 define a rear trough 250. Similarly, a front trough 252 is formed between the outside walls 222 and 224, the angled walls 246 and 248, and the front walls 236 and 238 of the L-shaped inside wall 228. The purpose and function of the front and rear troughs 250 and 252 are described in more detail below.

The angled walls 242 and 248 define a first angled or tapered entrance 254 for directing or guiding submerged amphibious life into the air environment within the bio-chamber 210. Likewise, the angled walls 246 and 244 also define a second angled or tapered entrance 256 for directing or guiding submerged amphibious life into the air environment within the bio-chamber 210.

A plurality of retaining walls are illustrated as being formed in proximity with water gates 258 and 260. Specifically, vertical retaining walls 262, 264, and 266 are formed in proximity with the water gate 258 and comprise different vertical dimensions. As illustrated, the retaining wall 262 has a smaller vertical dimension than the vertical retaining wall 264, which, in turn, has a smaller vertical dimension than the vertical retaining wall 266. In this configuration, as aggregate material, such as gravel, is deposited between the retaining walls 262 and 264 and between the walls 264 and 266, an inclined ramp surface is created to permit an amphibious creature, such as a crab, to rise vertically as it enters the bio-chamber 210.

Further, to assist in maintaining aggregate material between the vertical retaining walls 262, 264, and 266, the retaining wall 264 comprises a flat wall whereas the retaining walls 264 and 266 comprise curved walls extending from the rear wall 232 to the front wall 238. In this configuration, aggregate material may be securely deposited in the space 268 formed between the walls 262 and 264 and in the space 270 formed between the walls 264 and 266.

Similarly, vertical retaining walls 272, 274, and 276 are shown as extending from the rear wall 230 to the front wall 236. In a manner similar to the walls 262, 264, and 266, the walls 272 and 274 define a space 278 between them. Likewise, a space 280 is formed between the retaining walls 274 and 276. The retaining walls 272, 274, and 276 further comprise different vertical dimensions. As illustrated, the retaining wall 276 comprises a vertical dimension smaller than the vertical dimension of the retaining wall 274. In turn, the vertical retaining wall 274 comprises a smaller vertical dimension than the retaining wall 272. In this configuration, as aggregate material, such as gravel, is positioned on top of the base 216 and within the spaces 278 and 280, an inclined ramp of aggregate material is created to permit an amphibious creature, such as a crab, to rise vertically as it enters the bio-chamber 210 through the water gate 260.

A pressurized gas conduit 282 is illustrated as passing through a passageway 283 defined by a channel 284 for introducing gas under pressure into the bio-chamber 210. A proximal end 281 of the pressurized gas conduit 282 is coupled to a source of pressurized gas, such as a pump (not shown). Advantageously, the pressurized gas is introduced into the hood hollow interior 322 above a water line within the hood interior 322 to prevent bubbling and to reduce the amount of vapor or mist within the hollow interior to enhance visibility.

To permit debris to be withdrawn from within the bio-chamber 210, a plurality of apertures or perforations 286 are formed in the base 214. As discussed above, where stand-pipes are employed, debris may be withdrawn through apertures 286 formed in the base 216 of a bio-chamber 210.

Figure 20:
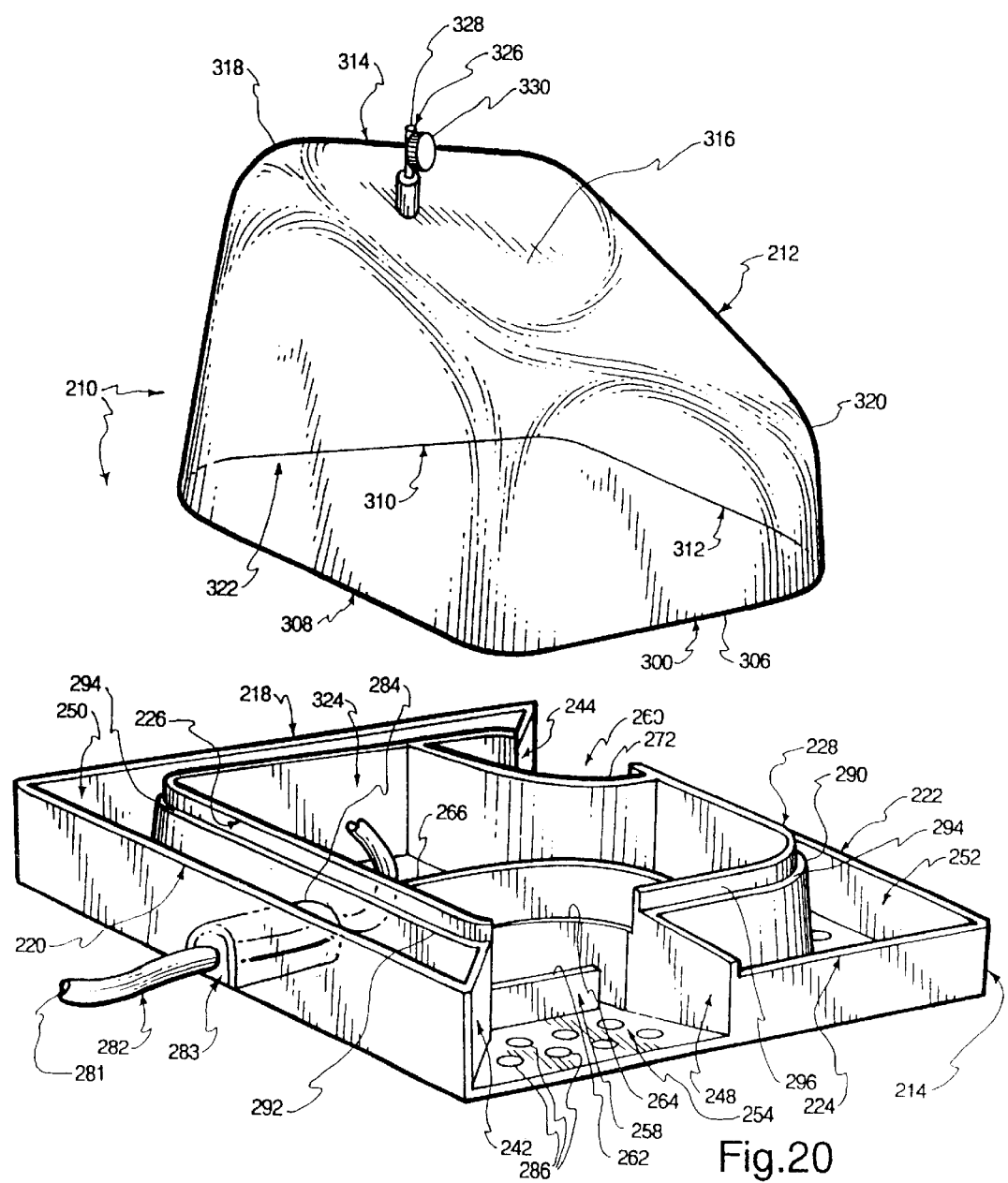
FIG. 20 is an exploded perspective view of the underwater air chamber of FIG. 19.

As illustrated in FIGS. 19 and 22, the hood 212 may be removably secured to the base 214. As shown in FIGS. 20, 21, and 22, steps 290 and 292 are respectively formed along a top edge of the L-shaped inside walls 226 and 228 for enabling an interference or snap-fit attachment between the hood 212 and the base 214. As shown in more detail in FIG. 22, the step 290 is formed in the L-shaped inside wall 226 and generally comprises a step bottom surface 294 and a step vertical surface 296. The step bottom surface 294 and the step vertical surface 296 are shown as being substantially perpendicularly oriented to each other and intersect along a corner 298. The hood 212 is shown as further comprising a vertically-directed side wall 300 having an inside surface 302 and an outside surface 304. The hood vertical wall 300 terminates at a transverse edge 306.

In the assembled configuration illustrated in FIGS. 19 and 22, the hood 212 is secured to the base 214 by pressing the hood 212 over the steps 290 and 292 formed on the L-shaped inside walls 226 and 228 respectively. As shown in FIG. 22, the inside surface 302 of the hood 312 is secured against the step vertical surface 296 in a tight, interference fit, resistance fit or snap fit attachment. Advantageously, the hood transverse edge 306 is pressed into contact with the step bottom surface 294 to create a tight fit between the hood 212 and the base 214.

As shown in FIG. 20, the hood 212 further comprises a contoured, inverted cup comprising vertically-directed side walls 300, 308, 310, and 312. The hood 212 further comprises a top wall 314 having a sloped top surface 316 which slopes from a point of intersection 318 with the walls 308 and 310 downwardly toward a point of intersection 320 with the walls 300 and 312. While the hood vertical walls 300, 308, 310, and 312, together with the hood top wall 314, may comprise discrete walls secured together, the hood 212 is advantageously formed of one piece.

The hood vertical side walls 300, 308, 310, and 312 define a hollow interior 322. When the hood 212 is secured to the base 214 by securing the hood bottom edge 306 against the step bottom surface 294, the hood interior 322 is positioned directly above and in fluid communication with the base chamber 324 defined by the L-shaped inside walls 226 and 228 and the retaining walls 266 and 272.

A gas effluent control, such as an adjustable valve 326, is coupled with the hood hollow interior 322 to selectively meter and control the release of gas from within the hood hollow interior 322. The adjustable valve 326 is illustrated in FIGS. 19 and 20 as being mounted on the hood top surface 316. The valve 326 further comprises a gas effluent end 328 and an adjustment knob 330. The valve 326 may be adjusted by adjusting the adjustment knob 330 to selectively control or meter the release of gas from within the hollow interior 322.

Alternatively, an elongated tube (not shown) may be coupled between the adjustable valve 326 and the hood interior 322 so that the valve 326 may be positioned above a water top surface when the bio-chamber 210 submerged within a conventional water aquarium. In such a configuration, the pressurized gas within the hood interior 322 would be vented directly into the atmosphere rather than into the water surrounding the bio-chamber 210.

Further, as pressurized gas enters the bio-chamber 210 through the pressurized gas conduit 282, the pressurized gas may be released from within the hood interior 322 through the adjustable valve 326, through the water gate 258, through the water gate 260, or through a combination thereof. Advantageously, the adjustable valve 326 may be adjusted so that large discontinuous bubbles are periodically discharged through the water gates 258 and 260. By releasing bubbles through the water gates 258 and 260, amphibious creatures, such as crabs, are attracted to the water gates, thus increasing the likelihood that the amphibious creatures will enter the bio-chamber 210 through the water gates 258 and 260.

In order to counteract the buoyant forces which act on the bio-chamber 210 as it is submerged within a conventional water aquarium, weights, preferably in the form of an aggregate material, such as gravel, are positioned on the base 214. It has been found that, as a general guideline, it requires about fifty percent (50%) of the volume of air in gravel to effectively oppose the buoyant forces acting on a bio-chamber submerged in an aquarium.

As such, the rear trough 250 and the front trough 252 may be effectively filled with gravel or other suitably dense material to assist in counteracting the buoyant forces acting on the bio-chamber 210. The base chamber 324 is also effectively filled with aggregate material, such as gravel, to both assist in counteracting the buoyant forces acting on the bio-chamber 210 and to provide a surface upon which amphibious creatures may dwell within the bio-chamber 210. Further, aggregate material is advantageously positioned within the spaces 268, 270, 278, and 280 formed between the retaining walls 262, 264, and 266, as well as the retaining walls 272, 274, and 276 respectively. As discussed above, filling the spaces 268, 270, 278, and 280 with an aggregate material, such as gravel, creates an inclined ramp surface to assist amphibious life in climbing into the bio-chamber 210 and also assists in counteracting buoyant forces acting on the bio-chamber 210.

FIG. 23 illustrates an alternate manner of securing a bio-chamber hood 650 to a bio-chamber base 652. As shown, the hood 650 comprises a hood exterior surface 654 and a hood interior surface 656. A flange 658 is illustrated as protruding from the interior surface 656. Specifically, the flange 658 comprises a flange top surface 660, a flange bottom surface 662, and a flange transverse surface 664.

The flange 658 is shown as being secured by a snap-fit attachment between upwardly-directed sidewalls 664 and 666. As shown, a space 668 is formed between the walls 664 and 666. The wall 664 is shown as comprising an outside surface 670 and an inside surface 672. Likewise, the wall 666 comprises an exterior surface 674 and an inside surface 676. The wall 664 terminates at a transverse edge 678. The wall 666 further comprises a flange 680.

As shown, the hood 650 is removably secured to the base 652 by securing the flange 658 within the space 668 formed between the sidewalls 664 and 666. Specifically, the flange bottom surface 662 is positioned against the transverse edge 678 of the sidewall 664 and the flange top surface 660 is positioned beneath the sidewall flange 680 so that the hood 650 is removably secured to the base 652 between the sidewalls 664 and 666.

FIG. 24 illustrates an alternate embodiment of a feeding device 340. As shown, the feeding device 340 generally comprises an L-shaped bracket 342, a funnel 344, and a J-shaped tube 346. In general, a proximal end 348 of the tube 346 is coupled to a funnel distal end 350 so that when a food object, such as an insect 352 is deposited within the hollow interior 354 of the funnel 344, the food object 352 may be flushed, for example with carrier water, from the funnel hollow interior 354 through the tube 346 and out a discharge end 356 of the tube 346.

As illustrated in FIG. 24, the feeding device 340 is mounted on and generally supported by an aquarium wall 358, comprising a top wall surface 360 and an inside surface 362. The L-shaped bracket 342 is shown as comprising a vertical member 366 and a horizontal member 368. The vertical member 366 and the horizontal member 368 of the L-shaped bracket 342 are oriented substantially perpendicularly to one another and further comprise a vertical member inside surface 370 and a horizontal member inside surface 372. The feeding device 340 is hung from the top surface 360 of the wall 358 by positioning the L-shaped bracket over the wall 358. Specifically, the horizontal member inside surface 372 is positioned on top of and adjacent to the top surface 360 of the wall 358. Additionally, the vertical member inside surface 370 is positioned against an outside surface of the wall 358. In this manner, the feeding device 340 may be hung from the wall 358.

As mentioned above, the feeding device funnel 344 comprises the portion of the feeding device 340 into which a food object may be deposited to be transported into a submerged location within a conventional aquarium. While the funnel 344 may be formed as a discrete member and rigidly attached to the horizontal member 368 of the L-shaped bracket 342, the funnel 344 is shown as being formed as one piece with the L-shaped bracket 346. The funnel 344 further comprises a substantially conically shaped inside surface 374 and a substantially conically shaped outside surface 376. The funnel inside surface 374 defines the funnel hollow interior 354. An aperture is formed at the funnel distal end 350 for discharging a food object such as the insect 352 with carrier water out of the funnel hollow interior 354 and into the tube 346.

The J-shaped tube 346, as mentioned above, is coupled to the funnel distal end 350 at a tube proximal end 348. The J-shaped tube 346 further comprises a hollow interior 380 in fluid communication with the funnel hollow interior 354. The tube 346 also comprises a curved portion 382 for changing the direction of travel of the food object 352 and carrier water within the tube 346 so that the food object 352 may be discharged in an upward direction through an opening 384 in a bio-chamber 386.

To further secure the feeding device 340 to the wall 358, a suction cup connector 388 is provided to secure the tube 346 to the wall interior surface 362. As illustrated, the suction cup connector 388 generally comprises a conventional suction cup 390 and a ring 392. The suction cup 390 is attached, by suction, to the wall interior surface 362 with the ring 392 rigidly mounted on a suction cup proximal end 394. The tube 346 is positioned within the ring 392 to restrict movement of the feeding device 340 relative to the wall 358.

FIGS. 25 and 26 illustrate a yet additional embodiment of a feeding device according to the present invention. This embodiment shows a feeding device 400. The feeding device 400 generally comprises a bulb 402 and a J-shaped tube 404. As shown, the bulb 402 may be coupled with the J-shaped tube 404 so that by squeezing the bulb 402, a food object such as an insect 406 may be advanced by flowing air through the J-shaped tube 402 and into the hollow interior of a submerged bio-chamber 403.

The bulb 402 is shown as comprising a substantially oval shaped member comprising an exterior surface 408, a bulb interior surface 410, and an opening 412. As shown, the bulb interior surface 410 defines a bulb hollow interior 414. While the bulb 402 may be formed of a variety of flexible materials, the bulb is preferably formed of rubber. By squeezing the bulb 402, and thus reducing the volume of the bulb hollow interior 414, air is forced out of the bulb hollow interior through the bulb opening 412.

The J-shaped tube 404 is shown as generally comprising a funnel-shaped portion 416, an elongated intermediate portion 418, and a curved discharge end 420. As shown, the diameter of the elongated intermediate portion 418 and that of the curved discharge end 420 are approximately the same, whereas the diameter of the funnel-shaped portion 416 gradually increases from an annular corner 422 to a tube proximal end 424. As shown, the outside diameter of the proximal end 424 is greater than the unstressed diameter of the bulb opening 412. Moreover, the outside diameter of the elongated intermediate portion 418 is also slightly greater than the unstressed diameter of the bulb opening 412 so that when the feeding device 400 is assembled in the configuration illustrated in FIG. 25, the bulb 402 is secured about the tube 404 by a substantially air-tight fit.

In general, after a food object 406 is deposited into the J-shaped tube 404 through the funnel-shaped portion 416, the bulb 402 is coupled to the J-shaped tube 404. To secure the bulb 402 to the J-shaped tube 404, the tube proximal end 424 is forced into the bulb hollow interior by pushing it through the opening 412. By pushing the tube proximal end 424 through the opening 412, the opening 412 is temporarily stretched into a larger diameter to accommodate the funnel-shaped portion 416. With the tube proximal end 424 positioned within the bulb hollow interior 414, the bulb opening 412 is secured, in a stressed condition, about the funnel-shaped portion 416 of the feeding device 400. In this configuration, a substantially air-tight seal between the bulb opening 412 and the funnel-shaped portion 416 is created so that by squeezing the bulb 402, the food object 406 is advanced through the J-shaped tube 404 and discharged through a discharge opening 426 formed at a distal end of the J-shaped tube 404 as shown in FIG. 26.

FIGS. 27 and 28 illustrate still another embodiment of an underwater bio-chamber according to the present invention. This embodiment shows a free-standing aquarium 440 which is shown as generally comprising a snap-on transparent lid 442, a tray 444, and a transparent tank 446.

The tank 446 is shown as generally comprising a contoured floor 448 peripherally bounded by upstanding side walls 450, 452, 454, and 456. The sidewalls 450, 452, 454, and 460 are advantageously formed of a transparent material to permit visual inspection of the tank contents.

With reference to FIG. 28, the contoured tank floor 448 further comprises a bio-chamber base 458 formed, as one piece, with the floor 448. As shown, the bio-chamber base 458 is shown as comprising angled walls 460 and 462, which are also integrally formed with a platform 464. The angled walls 460 and 462 and the platform 464 further comprise interior surfaces 466, 468, and 470 respectively, which define a hollow passageway 472.

As shown in FIG. 28, a source of pressurized gas, such as a conventional air pump 474, is positioned within the hollow passageway 472 for providing pressurized gas into a bio-chamber interior 491 as discussed below. The hollow passageway 472 further serves as a conduit so that ambient air may freely flow into the pump 474. As shown, a pressurized gas conduit 478 comprises a tube coupled, at one end, with the pump 474 for providing pressurized gas into the bio-chamber interior 491 positioned within the tank 446.

A bio-chamber hood 480 is secured within the tank 446 and is positioned over on the bio-chamber base 458. As shown in FIG. 28, the hood 480 generally comprises a hood top wall 481 which is peripherally bounded by vertically-directed side walls 482, 484, 486, and 488. A gas effluent control, such as an adjustable valve 497, is mounted on the top wall 481 for metering the release of pressurized gas out of a hood interior 491 defined by the walls 481, 482, 484, 486, and 488. A water door 492 is defined by edges 494, 496 and 499, for permitting amphibious life to selectively enter the hood interior 491. By adjusting the adjustable valve 497, the release of pressurized gas through the water door 492 may be selectively controlled. As discussed above, it is desirable to periodically emit large, discontinuous bubbles through the water door 492 to attract amphibious life, such as crabs, to the water door and into the bio-chamber interior 491.

The buoyant forces acting on the bio-chamber hood 480 are counteracted by weights in the form of aggregate material, such as gravel, positioned within a trough 501 formed about the hood 480. As shown, the trough 501 is defined by the angled walls 503 and 505 together with trough walls 507, 509 and 511. The weight of the aggregate material 513 within the trough 501 counteracts the buoyant forces acting on the hood 480 to secure the hood 480 within the tank 450 over bio-chamber base 458.

The tank 446 further comprises a step 498 formed in the walls 450, 452, 454, and 456. As shown, the step comprises a substantially horizontal surface 500 for supporting the tray 444 within the tank 446.

As illustrated in FIG. 28, the tray 444 comprises a horizontal plate 502 and an inclined plate 504. While the plates 502 and 504 may comprise discrete plates attached together, the horizontal plate 502 and the inclined plate 504 are advantageously formed as one piece. The horizontal plate 502 further comprises a top surface 506 and a bottom surface 508. Likewise, the inclined plate 504 comprises a top surface 510 and a bottom surface 512. As shown, the horizontal plate top surface 506 and the inclined plate top surface 510 intersect along corner 514 and are oriented at an inclination angle θ. Advantageously, the angle of inclination θ comprises an angle of about 45°. A notch 516 is shown as being formed in the horizontal plate 502 so that the tray 444 does not interfere with the pressurized gas conduit 478.

When assembled, the tray 444 is positioned within the tank 446 as shown in FIG. 28. The horizontal plate bottom surface 508 is positioned and rests upon the horizontal surface 500 of the step 498. As shown, the inclined plate 504 has a smaller width than the horizontal plate 502 so that the inclined plate 504 does not contact the step 498, but rather extends downwardly below the step horizontal surface 500. As shown in FIG. 28, the tank 446 is advantageously filled with water to a level just below the step 500 and above a tray transverse edge 518 so that an amphibious creature, such as a turtle 520, may selectively leave a water environment by climbing up the inclined surface 510 onto the horizontal surface 506. To assist amphibious life in climbing the inclined surface 510, a plurality of grooves 522 are formed in the tray inclined top surface 510.

To cover the contents of the tank 446, the snap-on transparent lid 442 may be removably secured to a top edge 524 of the tank 446. A plurality of apertures 526 are advantageously formed through the lid 442 to serve as air vents to permit ambient air to enter the tank 446. To facilitate removing the lid from the tank 446, a handle 528 is shown as being integrally formed with the lid 442. Because of the transparent nature of the lid 442, amphibious life on the tray top surface 506 and elsewhere within the tank can be viewed through the lid 442.

FIGS. 29 and 30 illustrate a yet additional embodiment of the present invention. This embodiment shows a free-standing aquarium 550. The free-standing aquarium 550 is shown as generally comprising a transparent detachable lid 552 and tank 554. The tank 554 is shown as comprising a floor 556 peripherally bounded by transparent side walls 558, 560, 562, and 564.

The floor 556 further comprises a bio-chamber base 566 integrally formed with the floor 556. As shown, the bio-chamber base 566 is shown as generally comprising side walls 568, 570, 572, and 574 which are illustrated as being formed as one piece with a base platform 576. Accordingly, the side walls 568, 570, 572, and 574, together with the base platform 576 comprise the bio-chamber base 566 upon which a transparent bio-chamber hood 578 may be secured.

The bio-chamber hood 578 is shown as comprising a top wall 580 peripherally bounded by hood side walls 582, 584, 586, and 588. As shown, a water gate or entryway 590 is formed in the hood side wall 584 and is defined by edges 592 and 594. The water gate 590 permits a passageway through which amphibious life within the aquarium 550 can selectively leave the aquarium water environment for a dry environment.

As illustrated in FIG. 30, the hood 578 is secured to the bio-chamber base 566 by pins 587 and 589. The pins 587 and 589 are shown as passing through the hood side walls 586 and 582 respectively. The pins further extend into the base platform 576. In this configuration, the hood is secured to the bio-chamber base 566 and the buoyant forces acting on the hood 578 are effectively counteracted.

A dry environment is created within the hood hollow interior 596 by introducing a gas, such as air, under pressure into the hood hollow interior 596 through a pressurized gas conduit 598. The pressurized gas conduit 598 is shown as being in fluid communication with the hood hollow interior 596 and connected to the hood side wall 588. The pressurized gas conduit 598 further extends over an aquarium top edge 600 and down a groove 602 formed in the aquarium side wall 564. A conventional pump 604 serves as a source of pressurized gas for the bio-chamber hood interior 596. As shown, the pump 604 is positioned within a pump chamber 606 defined by the bio-chamber base side walls 568, 570, 572, and 574, together with the base platform 574 together with the base platform 576.

As shown in FIG. 29, the pressurized gas conduit 598 is coupled to the pump 602 at a proximal end 603 of the pressurized gas conduit 598. Accordingly, the pump 604 pumps a gas, such as air, under pressure through the pressurized conduit 598 into the hood hollow interior 596. As the pressurized gas is delivered into the hood hollow interior 596, water disposed within the hood hollow interior 596 above the water gate edge 592 is forced out of the hood hollow interior 596 through the water gate 590 as the pressure of the gas within the hood hollow interior increases. The air pressure within the hood hollow interior 596 can be selectively controlled by adjusting a gas effluent control, such as an adjustable valve 610, mounted on the hood top wall 580 and coupled with the hood hollow interior 596. By adjusting the adjustable valve 610, the pressure of the gas within the hood hollow interior 596, and thus the water level within the hollow interior 596, can be selectively adjusted.

To enhance the supply of ambient air to the pump 604 positioned within the pump chamber 606, air vents 612 and 614 are formed respectively adjacent to the side walls 558 and 564 of the tank 554. The air vents 612 and 614 are in fluid communication with the pump chamber 606 so that ambient air can freely enter the pump chamber 606.

An island 620 is shown as being positioned within the aquarium interior 622 to provide an above-water dry environment for amphibious life, such as turtles 624 and crabs 626. As illustrated in FIGS. 28 and 29, the island 620 generally comprises an inclined ramp top surface 628, an island top surface 630, and a cliff portion 632. While the island 620 may comprise a selectively removable insert for the tank 554, the island 620 is advantageously formed as one piece with the tank 554. The inclined ramp top surface 628 is shown as being positioned adjacent to, and advantageously formed integrally with, the aquarium side wall 560. As shown, the inclined ramp top surface 628 extends from the island top surface 630 to the floor 556 to enable amphibious creatures, such as crabs 631, to climb from the floor 556 to the island top surface 630 on the ramp top surface 628. A plurality of grooves 634 are formed on the ramp top surface 628 to assist amphibious life in climbing up the inclined ramp surface 628.

The ramp top surface 628 intersects the island top surface 630 along a ramp top edge 636. The island top surface 630, as illustrated in FIGS. 29 and 30, is shown as being positioned adjacent to, and is advantageously formed integrally with the side walls 560 and 562 of the tank 554. Advantageously, the island top surface 630 is positioned above a water top surface 638 of the water within the aquarium so that the island top surface 630 comprises a dry region above the water top surface upon which amphibious life within the free-standing aquarium 550 may dwell.

Additionally, a cliffs portion 632 is illustrated as being formed integrally with the island 620 to provide an area of the island 620 which comprises a region of adjacent discontinuous surfaces which simulate a rocky environment. As shown in FIGS. 29 and 30, it is advantageous that at least a portion of the cliffs portions 632 be positioned above the water top surface 638.

To facilitate carrying the free-standing aquarium 550, base handles 640 are formed in the tank 554. Likewise, handles 644 are also formed in the lid 552. As shown in FIG. 30, the lid 552 may be removably attached to the tank 554 by a snap-fit attachment to enable easy viewing of the contents of the aquarium interior 622. The lid 552, as well as the tank 554, are advantageously formed of a transparent material so that the contents of the aquarium interior may also be easily viewed through the lid with the lid secured to the tank.

In operation, the underwater air chamber 20 is submerged within the aquarium 120 in a volume of water beneath the water top surface 138. A gas, such as air or oxygen, under pressure is delivered into the chamber 38 through a pressurized gas tube 46. Introducing pressurized gas into the chamber 38 forces the chamber water level 90 downwardly to create a dry environment within the chamber 38.

The gas pressure within the chamber 38 may be controlled by adjusting the gas effluent control 34 by selectively rotating the knob 35 so that the pressurized gas within the chamber 38 may be controlledly discharged from within the chamber 38 through the effluent end 33 of the control 34 in the form of bubbles.

The pressurized gas within the chamber 38 may also escape from within the chamber 38 by passing through the entryway or water door 36. As the gas pressure within the chamber 38 forces the chamber water level 90 down to the level of the top edge 40 of the entryway 36, the pressurized gas within the chamber 38 is released in relatively large, discontinuous bubbles through the entryway 36. Generally, an amount of water surface tension must be overcome by the air bubbles in order to escape through the water door 36. By periodically releasing large, discontinuous bubbles from the water door or entryway 36, amphibious creatures within the aquarium are attracted to the entryway 36 of the bio-chamber 20.

Food may be also introduced from above the water surface 138 into the bio-chamber 20 through the feed tube 136. To introduce food into the hollow interior 38 of the bio-chamber 20, a food object is placed within the enlarged end 140 of the feed tube 136. Once the food object is within the feed tube 136, an amount of carrier water may be used to advance the food object, such as the insect 146, by gravity through the feed tube and into the hollow interior 38 for consumption by an amphibious creature 71.

To remove unwanted debris from within the aggregate material 68 of the aquarium 120 and from within the bio-chamber 20, stand pipes 94 and 96 are positioned within the aquarium 128 to cause an upward flow of water and debris into the stand pipes 94 and 96 by virtue of a bubbling action. The bubbling action within the stand pipes 94 and 96 results from introducing pressurized gas through the conduits 112 and 114 into pumice blocks 172 and 182 respectively. The drawing action of the stand pipes 94 and 96 pulls debris downwardly through the apertures 72 formed in the bio-chamber 22 and through the apertures 162 formed in the platform 150 into the stand pipes 94 and 96. By this manner, debris within the bio-chamber and within the aquarium aggregate material 68 generally may be continuously removed.

With respect to the embodiment illustrated in FIGS. 19 through 21, the hood 212 is affixed, by a snap-fit or resistance fit attachment to the base 214 by positioning the hood bottom transverse edge 306 against and adjacent to the step bottom surface 294. The step vertical surface 296 is secured against the hood interior surface 597 so that the hood 212 is removably secured to the base 214. With the hood 212 secured to the base 214, the bio-chamber 210 is assembled and may be positioned, in a submerged state, within an aquarium interior.

Pressurized gas is supplied into the bio-chamber 210 through the pressurized gas conduit 282 and through passageway 283 defined by the channel 284. As the pressure of the gas within the hood 212 increases, any water positioned within the hood 212 above the hood transverse edge 306 is displaced from within the hood 212 and exits the bio-chamber 210 through the water gates 258 and 260 to create an air environment within the hood 212. The gas pressure within the hood 212, and thus the water level within the hood 212, may be effectively adjusted by adjusting the adjustment knob 330 of the adjustable valve 326 to control the flow of gas through the gas effluent end 328 of the adjustable valve 326. By this manner, the gas pressure, and thus the water level, within the hood 212, may be effectively controlled.

To counteract buoyant forces acting on the bio-chamber 210 while it is submerged in an underwater environment, aggregate material, such as gravel, which serves as weight, is positioned on the base bottom wall 216 of the bio-chamber base 214. Specifically, aggregate material is advantageously positioned within the rear and front troughs 250 and 252 formed in the base 214. Additionally, the aggregate material is positioned within the cavities 268 and 270 formed between the retaining walls 262, 264, and 266. Likewise, aggregate material is positioned within the cavities 278 and 280 formed between the retaining walls 272, 274, and 276. In addition to helping counteract buoyant forces acting on the bio-chamber 210, the aggregate material positioned within the cavities 268, 270, 278, and 280 also assists in forming an inclined ramp upon which amphibious life can selectively enter and exit the hood hollow interior 322. Aggregate material is further positioned within the base chamber 324 to counteract buoyant forces acting on the bio-chamber 210, as well as to provide an elevated area upon which amphibious life within the bio-chamber 210 may dwell.

FIG. 23 shows an alternate manner of securing a hood 650 to a base 652. According to this embodiment, a flange 658 is formed along a bottom edge 652 of the bio-chamber hood 650. The hood 650 is secured to the base 652 by positioning the hood flange 658 within a space 668 formed between the sidewall 664 and 666. Specifically, the bottom edge 662 of the flange 664 is positioned adjacent to a transverse edge 678 formed on the sidewall 664. The top surface 660 is positioned beneath a flange 680 formed on the sidewall 666. By this manner, the hood 658 may be secured to a bio-chamber base 652 by a snap-fit attachment.

The feeding device 340 illustrated in FIG. 24 provides a device by which a food object, such as the insect 352, may be passed from a position above a water top surface into a bio-chamber 386. As shown, the feeding device 340 is secured to an aquarium wall 358 by hanging the L-shaped bracket 342 over the aquarium wall top surface 360. The J-shaped tube 346 is secured to the aquarium wall inside surface 362 by a suction cup connector 388. In operation, the food object 352, is positioned within the hollow interior of the funnel 344. An amount of carrier water is then poured into the funnel hollow interior 354 to carry the food object through the J-shaped tube 346 and to discharge the food object 352 through the tube discharge end 356 into the bio-chamber 386. By this manner, amphibious life within the bio-chamber 386 can conveniently eat the food object in a substantially dry environment created by the bio-chamber 386.

FIGS. 25 and 26 illustrate another embodiment of a feeding device 400 for transporting a food object into a submerged bio-chamber. In operation, the bulb 402 is detached from the J-shaped tube 404 to permit a food object 406 to be introduced into a proximal end 424 of the J-shaped tube 404. Once a food object 406 is positioned within the J-shaped tube 404, the bulb 402 is re-attached to the J-shaped tube 404 by expanding the diameter of the bulb opening 412 to accommodate the proximal end 424 of the J-shaped tube 404. Once the funnel-shaped portion 416 of the J-shaped tube 404 is positioned within the bulb hollow interior 414, a substantially air-tight seal is created between the bulb opening 412 and the J-shaped tube 404. With the feeding device 400 assembled as shown in FIG. 25, the food object 406 may then be advanced into a bio-chamber by positioning the tube distal end 426 within an underwater bio-chamber and firmly squeezing the bulb 402 to force air, under pressure, through the J-shaped tube 404 to blow the food object 406 into a submerged bio-chamber through the J-shaped tube 404 and the J-shaped tube distal end 426.

FIGS. 27 and 28 show that a removable tray 444 may be positioned within a free-standing aquarium unit 440 to permit amphibious creatures, such as the turtle 520, to climb out of a water environment and dwell in a substantially dry environment above the water surface of the water disposed within the tank 446. Further, amphibious creatures, such as crabs, can also dwell in a substantially dry environment beneath the water top surface by entering the bio-chamber 480. A dry environment is created within the bio-chamber hood 480 by positioning the hood 480 over the bio-chamber base 458 integrally formed in the tank floor 448. Gas under pressure is introduced into the hood interior 491 through a pressurized gas conduit 478 to displace any water within the hood 480 above the hood edge 496. As the gas pressure within the hood interior 491 increases, the water level within the hood interior 491 lowers as water is forced out of the hood interior 491 through the water door 492. The air pressure, and thus the water level within the hood 482, may be selectively controlled by adjusting a gas effluent control, such as the adjustable valve 497. The transparent lid 442 can be removably secured to the tank 446 to selectively cover the tank contents. Airflow into and out of the tank interior is facilitated through the apertures 526 formed in the lid 442.

FIGS. 29 and 30 show another embodiment of a free-standing aquarium 550 according to the present invention. In this embodiment, amphibious life may dwell within an air environment within the hood hollow interior 596 beneath the water top surface 638. The air environment within the hood hollow interior 598 is created by securing the hood 578 to a bio-chamber base 566. With the hood 578 secured to the base 566, pressurized gas, such as air, is introduced into the hood interior 596 to displace water within the hood interior and above the edge 592 formed in the hood. As the gas pressure within the hood 596 increases, the water level within the hood interior 596 is lowered, thus creating an air environment within the hood hollow interior in which amphibious life may selectively enter. The gas pressure within the hollow interior 596 may be adjusted by adjusting the adjustable valve 610 coupled with the hollow interior 596.

In this embodiment, amphibious life may also climb onto a dry environment created above the water top surface by climbing onto the island 620 formed within the tank interior 622. The amphibious life may climb up the inclined ramp 628 to reach the island top surface 630. A transparent removable lid 552 may be selectively attached to the base 554 to selectively cover the contents of the base 554 while still permitting the contents to be viewed through the transparent lid 552.

Reference is now made to FIGS. 31 through 34, which illustrate a compact submergible bio-chamber aquarium accessory, generally designated 700. Bio-chamber 700 is designed to provide an air chamber submerged within an aquarium, as a habitat for amphibious creatures. Bio-chamber 700 comprises a removable upper hood, generally designated 702 and a lower base, generally designated 704.

Hood 702 is illustrated as being transparent to accommodate visual inspection of the chamber 700 by human observers. The hood 702 is preferably formed of suitable synthetic resinous materials and comprises a continuous wall 706, which is substantially of uniform thickness. Wall 706 comprises a front wall segment 702, which is illustrated as being substantially planar, a rounded top wall segment 710, opposed substantially identical though opposite hand side wall segments 712 and a rounded back wall portion 714.

The hood 702 is preferably formed as one piece through commercially available molding techniques. The hood 702 comprises a bottom edge 716, which lies in a single plane as well as opposed outwardly-directed offset tabs 718. At the inside surface of opposed side walls 712 are disposed two substantially identical though oppositely directed wedge-shaped female recesses 720, which are aligned with the tabs 718, for releasible receipt and latching against wedge-shaped tabs carried by the base 704, as explained herein in greater detail.

The hood 702 also is apertured at 722 to rotatably receive a proximal end 724 of an L-shaped air discharge tube 726. The aperture 722 may be located anywhere along either side wall segment 712, front wall segment 708 or the back wall segment 714. The press fit relationship between aperture 722 and the proximal end 724 of the tube 726 accommodates rotation of the tube 726 within the aperture 722 so that the distal end 728 of the tube 726 may be placed at any one of several elevations, which assists in controlling the water level/air level interface within the interior of the chamber 700, as explained in some greater detail hereinafter.

The hollow interior of the tubs 726 is sized to emit only a limited amount of pressurized effluent gas, usually air, from the hood 702 so that the gas environment within the hood 702 is maintained without need for a discharge valve.

The base 704 is in the nature of a submerged island and comprises a bottom perforated plate 730. The perforations 732 accommodate a flow of liquid into and out of a base frame, generally designated 734. The base frame 734 at the top thereof is shaped so as to correspond generally to the shape of the edge 716 of the hood 702, accommodating placement of the hood 702 over the top of the base frame 734 so as to rest upon a shoulder 736. The base frame may comprise a single wall or multiple walls such as the spaced double wall configuration illustrated in FIG. 31B. A lip 738 extends above the shoulder 736 and defines, at opposite sides, a wedge-shaped male tab 740, sized, shaped and located so as to releasibly latch into the two wedge-shaped recesses 720 of the hood 702, to thereby releasibly lock the hood 702 to the base 704. Thus tabs 740 and recesses 720 are male/female releasible connectors which connect in force fit relation The releasible lock, so formed, is strong enough so that separation of the hood 702 from the base 704 due to internal air pressure within the chamber 700 does not occur.

The base plate 730 and the base frame 734 may be formed as one piece, using available plastic molding technology.

Figure 32:
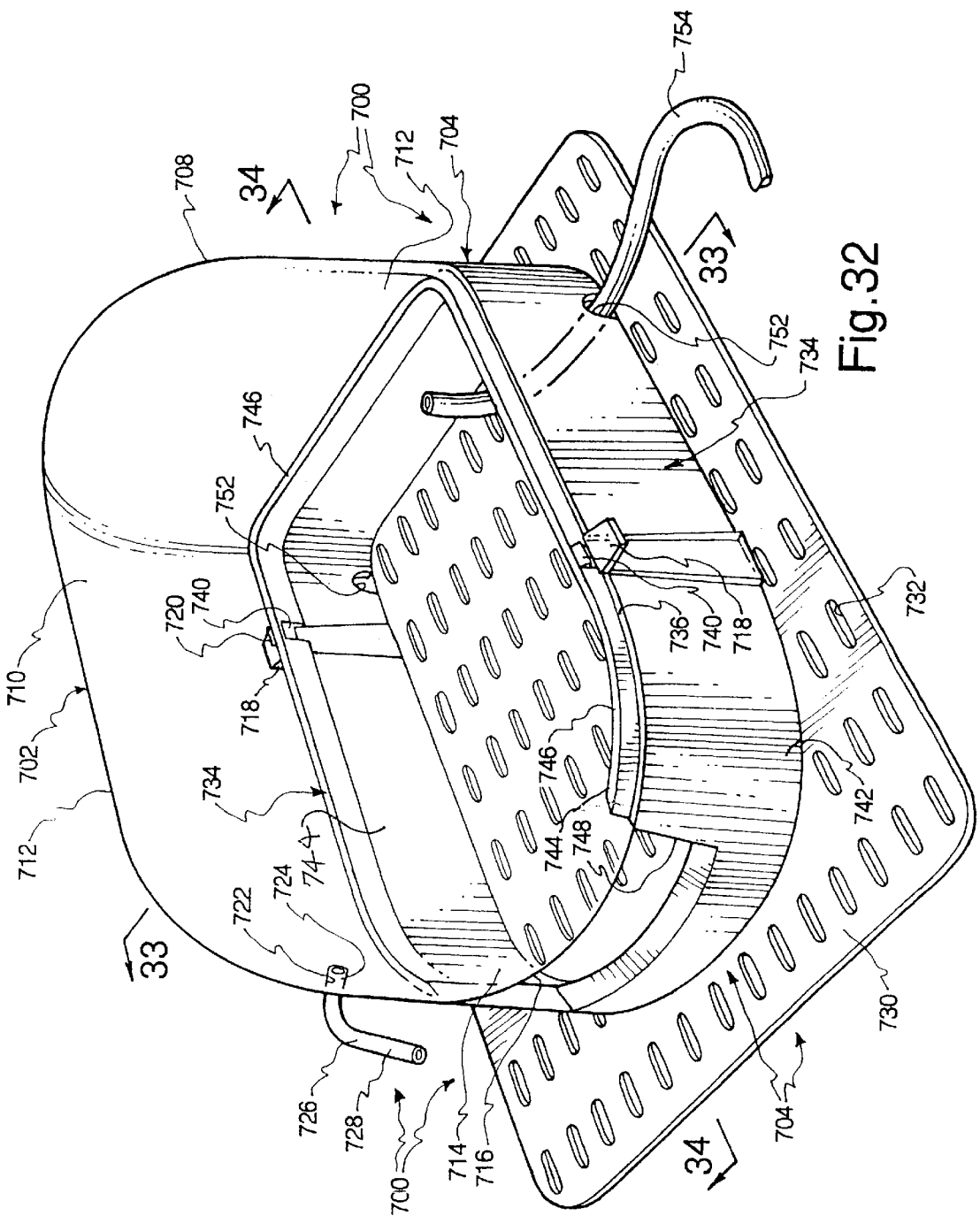
FIG. 32 is a perspective of the bio-chamber of FIG. 31.
Figure 33:
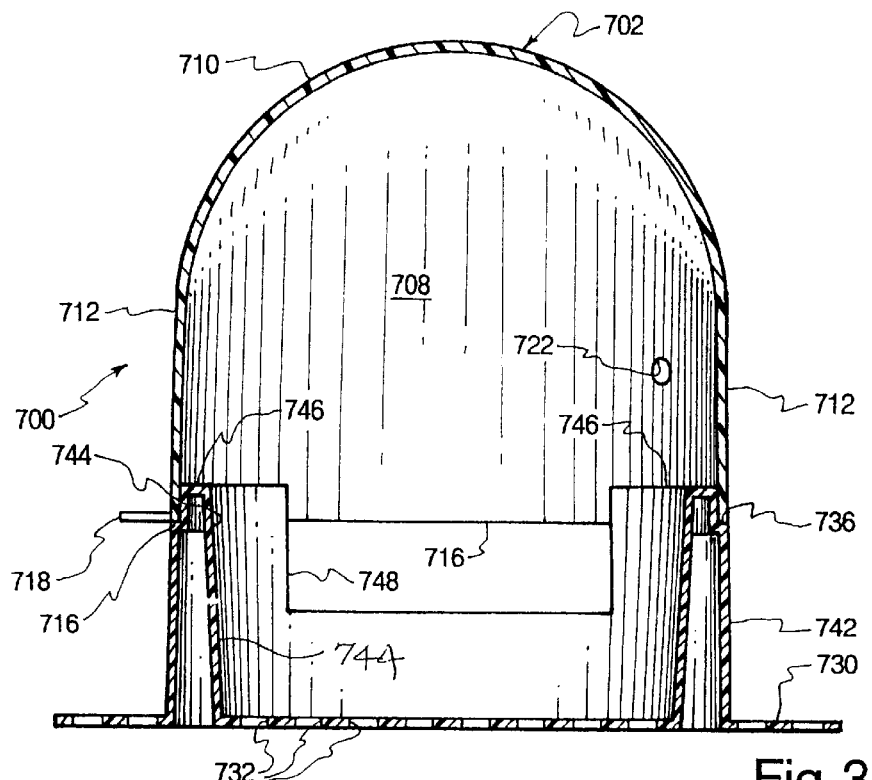
FIG. 33 is a cross section taken along lines 33—33 of FIG. 32.
Figure 34:
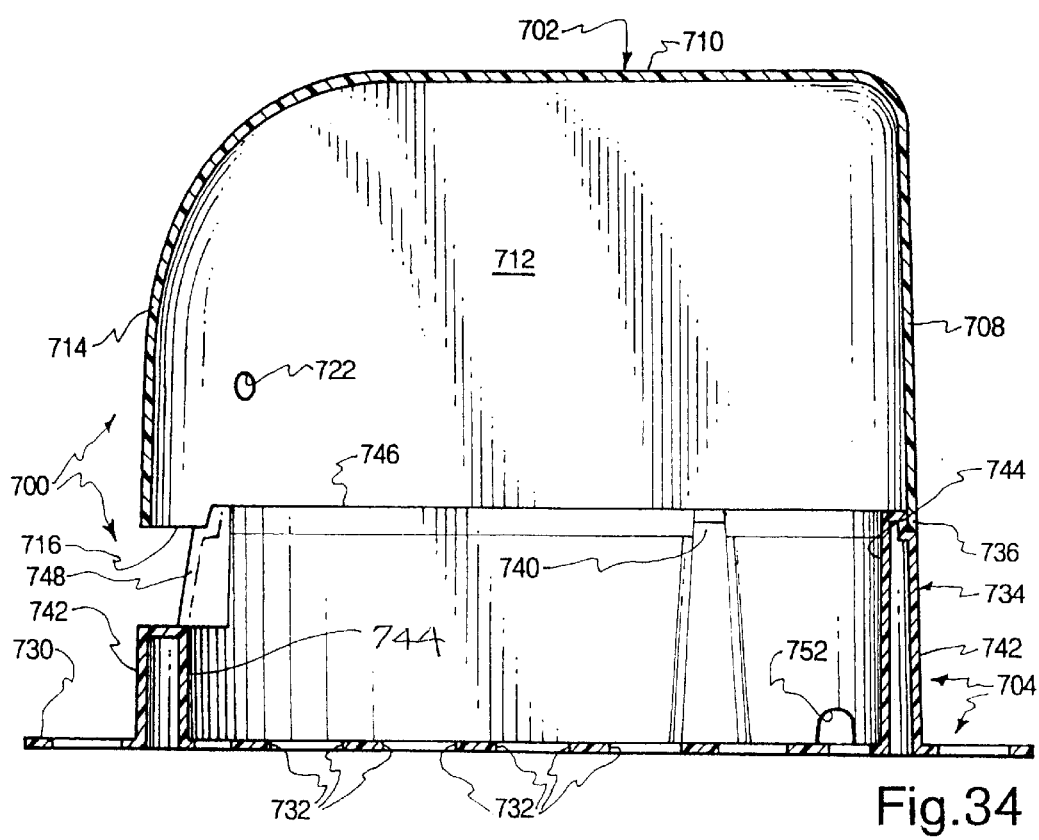
FIG. 34 is a cross section taken along lines 34—34 of FIG. 32.

The base frame 734 comprises an external wall 742, which defines previously mentioned shoulder 736. An internal wall 744 defines an upper edge 746 as well as the wedge-shaped tabs 740 at locations immediately below the upper edge 746. The tabs 740 are located to releasibly engage the recesses 720 in force-fit relationship. Edge 746 is illustrated as being disposed in a single plane, which plane is interrupted by a U-shaped entry way 748, through which amphibious creatures enter and leave (ingress and egress) the hollow volume defined within the base frame 734 and the hood 702, when properly assembled for use as shown in FIG. 32. The inside wall 744 defines a hollow volume within the base frame 734 into which ballast 750 comprising particulate material is placed, the top surface serving as a resting location for the amphibious creatures. Preferably, the ballast 750 is sloped downwardly toward the ingress/egress opening 748. The ballast 750 rests upon the base plate 730 and holds the chamber 700 in the selected position within an aquarium or the like. The particulate material may comprise synthetic particles, naturally occurring particles or some of each and may be of any desired color. The internal and external walls 744 and 742 are apertured at 752, to accommodate receipt of an air influent tube 754 beneath the water level in the chamber 700 for the purposes described above.

Figure 31A:
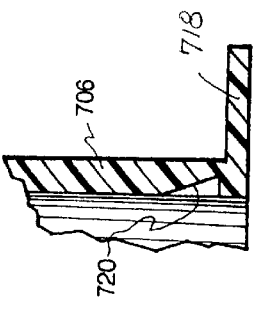
FIG. 31A is a cross section taken along lines 31A—31A of FIG. 31.
Figure 31B:
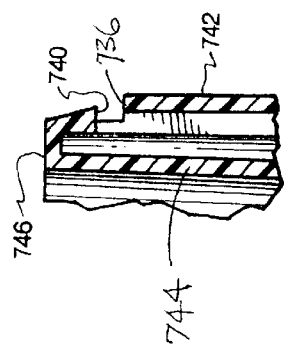
FIG. 31B is a cross section taken along lines 31B—31B of FIG. 31.

The bio-chamber 700, when assembled as illustrated in FIG. 32, and filled with ballast, as illustrated in FIG. 31, is placed in a submerged location within an aquarium as explained above, amphibious creatures entering through access opening 748 to obtain a submerged air environment.

It should be noted that opposed aligned aperture 752 exists through the double walls of the base frame 734. See FIG. 32. The level of the water/air interface within the operative chamber 700 is controlled, to some extent, by manually rotating the L-shaped tube 726. As illustrated in FIGS. 31 through 34, the chamber 700 may be compact, providing an available embodiment of the present invention for use with small aquariums, on a cost effective basis.

Figure 37:
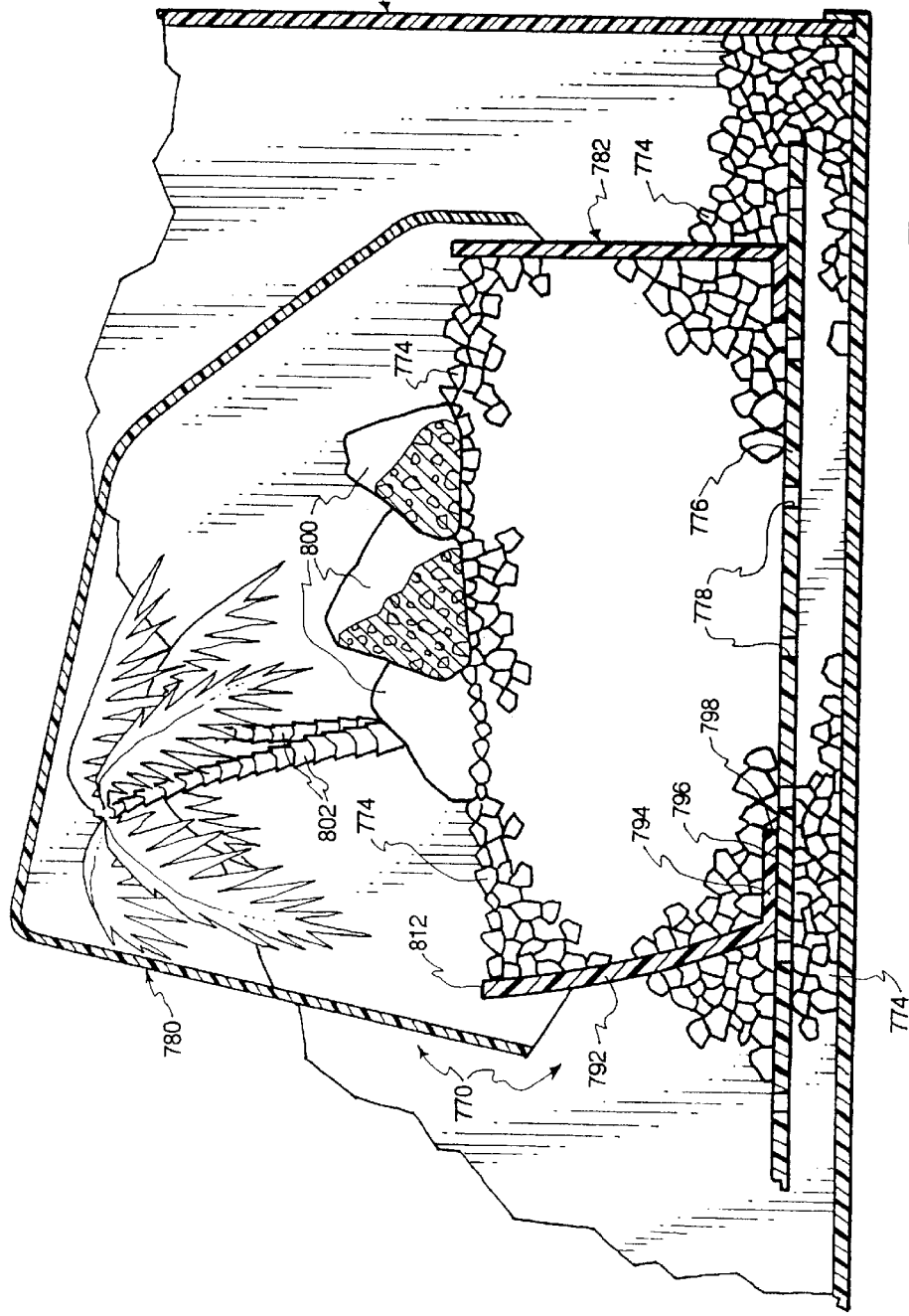
FIG. 37 is a cross section taken along lines 37—37 of FIG. 37.
Figure 36:
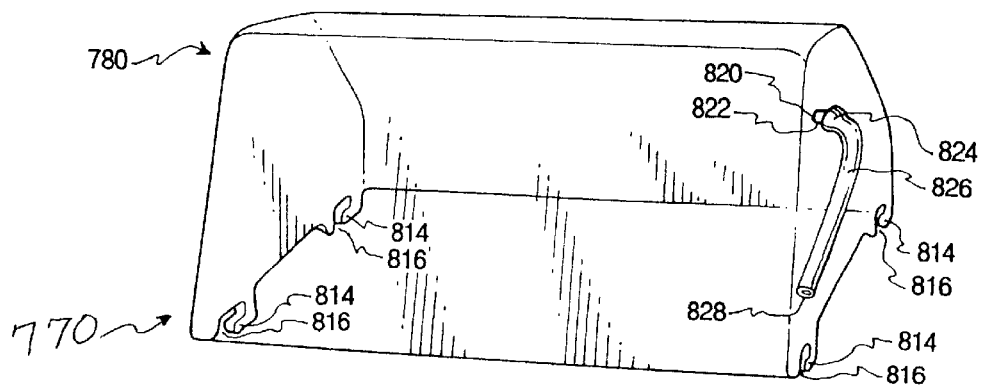
FIG. 36 is a reduced-sized perspective of a hood for the base embodiment of FIG. 35.
Figure 35:
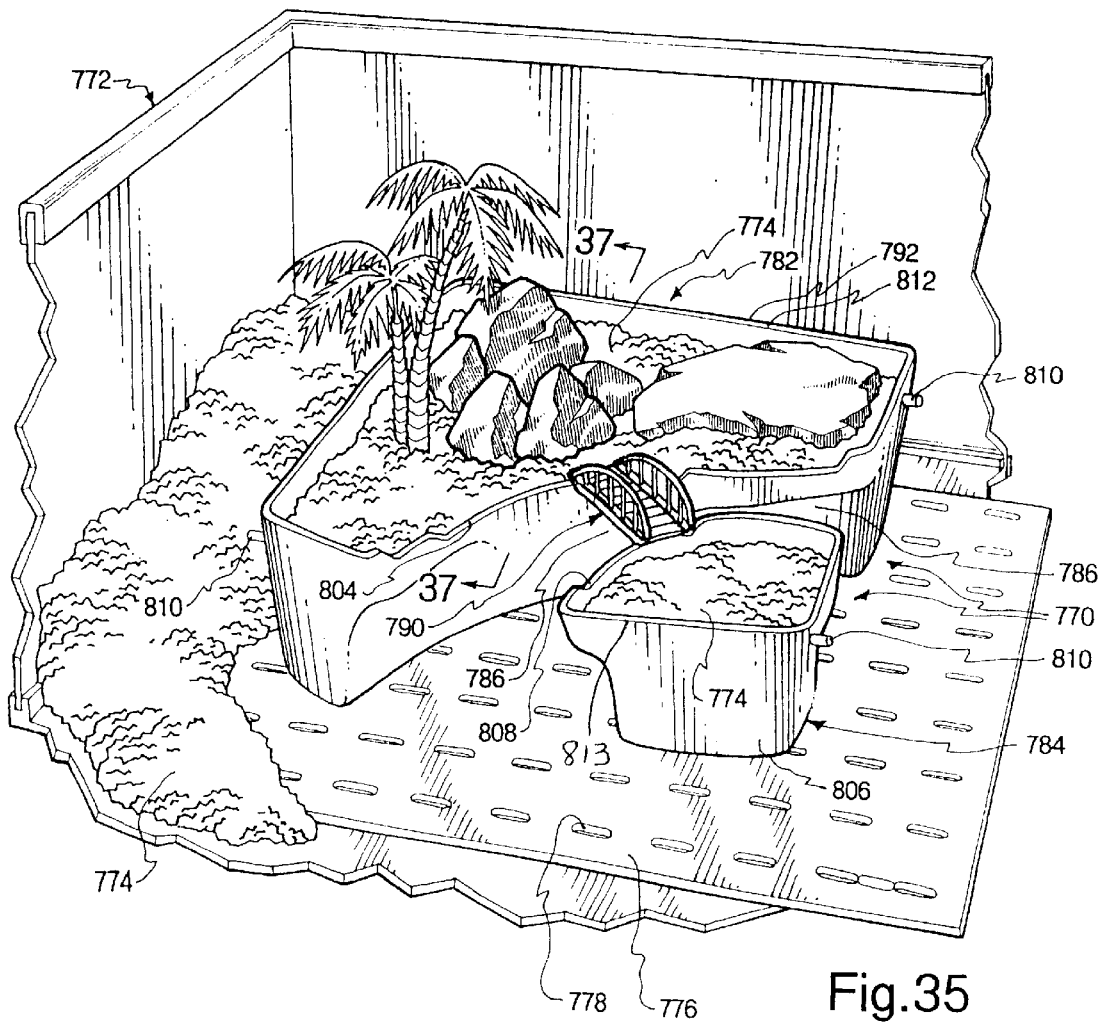
FIG. 35 is an enlarged fragmentary perspective of a swim-through base embodiment of the present invention.

Reference is now made to FIGS. 35 through 37, which collectively illustrate a swim-through submergible chamber embodiment of the present invention, generally designated 770. The swim-through bio-chamber 770 is illustrated as being disposed within an aquarium, generally designated 772, which is illustrated as being without water, but with some ballast 774 contained within the aquarium 772. The ballast 774 may be of synthetic or natural particles or both and of any suitable size, or may comprise a range of sizes, as appropriate and desired by those skilled in the art. As shown in FIG. 35, some of the ballast 774 is disposed outside the bio-chamber 770, being located upon top of a mountain plate 776. This assists in holding the bio-chamber 770 in a desired position within the aquarium 772. The mounting plate 776 is perforated at elongated apertures 778, to accommodate displacement of liquid across the mounting plate 776.

The bio-chamber 770 comprises a hood, generally designated 780, a large island, generally designated 782 and a smaller island, generally designated 784. More than two islands may be provided. A space or channel 786 exists between the islands 782 and 784. A bridge 788 is illustrated as spanning over the swim-through gap 786 between the islands 782 and 784. This allows amphibious creatures to move from the top of one island to the top of the other, as desired.

Island 782 is illustrated as comprising a U-shaped open top container 792, which comprises a lower flange 794, which is bonded or otherwise secured to the top surface of the mounting plate 776, at interface 796. See FIG. 37. The container 792 is, therefore, in the nature of a side frame, the interior bottom thereof comprising a relatively large aperture 798, allowing water to flow through the apertures 778 of mounting plate 776 into and from within the hollow interior of the container 792. The interior of the container 792 is filled with ballast 774 and may have decorative items upon or exposed at the top surface of the ballast, such as rocks 800 and/or palm trees 802. The container 792 is equipped with a recess 804, which comprises an ingress (entry) and egress (departure) site for amphibious creatures to move unto the island 782 from the swim-through channel 786. The creatures, in lieu of accessing to the top of the island 782, may simply swim along or through the channel 786.

The smaller island 784 is constructed substantially the same as the above-described construction of island 782, except it is of smaller size. Thus, the island 784 comprises a cup-shaped container 806, illustrated as being of uniform wall thickness and comprising a bottom flange with a hollow central aperture, as is the case with container 792, described above. Thus, the slots or apertures 778 of the mounting plate 776 are exposed at the bottom of the container 806 to accommodate flow of liquid into and out of the container 806 as the water level within the chamber 770 is altered. The container 806 is suitably secured to the mounting plate 776 using adhesive, bonding agent, plastic welding or other suitable technology for such a connection. The container 806 is filled in part with ballast 774. Cup 806 comprises a recessed portion 808, accommodating access (ingress and egress) by amphibious creatures from the swim-through channel 786 onto the top surface of the ballast 774 contained in the container 806.

Integral with the container 792 are three spaced pegs or pins 810, two of which are shown in FIG. 35. These pegs 810 are located slightly below the upper edge 812 of the container 792 and are adapted to fit within certain L-shaped slots of the hood 780, as explained in greater detail herein. Container 806 also comprises a peg or pin 810, adapted to receive the fourth of four slots of the hood 780, as explained below. The upper edge 813 of the container 806 is preferably located within the same plane as edge 812.

The hood 780 is illustrated as being elongated and comprised of transparent synthetic resinous material. The lower edge of the hood 780 comprises L-shaped tabs 814, each of which defines an L-shaped slot 816. See FIG. 35. The tabs 814 and slots 816 are sized and located so as to accommodate receipt of the pins or pegs 810 by bidirectional or biaxial displacement, allowing the hood 780 to be shifted so that the pins 810 become located directly above the tabs 814 thereby preventing inadvertent lifting of the hood 780 from the islands 782 and 784 by pressure within the chamber 770. Thus tabs 814, slots 816 and pins 810 are male/female releasible connectors, which connect by biaxial displacement. In this way, the bio-chamber 770 is formed so as to provide an air chamber, with a liquid interface at the bottom. Thus, amphibious creatures may swim through the channel 786 and may access at entry site 804 onto the top of the island 782 or enter through ingress site 808 onto the top of island 784. Travel between the islands by such amphibious creatures over bridge 790 is accommodated.

The hood 780 also comprises an aperture 820 through which a hollow fitting 822 rotatably extends. The fitting 822 is exposed, in part, at the exterior of the hood 70 and receives in compression fit relation the proximal end 824 of an air discharge tube 826. The tube 826 is L-shaped and comprises a discharge distal end 828. The tube 826 may be manually rotated along with the fitting 822 so that the distal end 828 can be placed at any one of a plurality of desired elevations to assist in controlling the location of the interface between the air and the water within the chamber 770 when disposed in a submerged orientation within the aquarium 772.

The invention may be embodied in other specific forms without departing from the spirit of essential characteristics thereof. The present embodiments, therefore, are to be considered, in all respects, as illustrative and are not restrictive, the scope of the invention being indicated by the appended claims rather than by the foregoing description, and all changes which come within the meaning and range of equivalency of the claims are, therefore, intended to be embraced therein.

What is claimed and desired to be secured by Letters Patent is:

1. A submergible chamber into which amphibious creatures ingress and egress for subterranean access to air, the chamber comprising an upper hood and a lower island segment, the lower island segment comprising at least one hollow container comprising a flat base plate adapted to rest contiguously upon a selected location on an aquarium with particulate matter disposed within the hollow of the hollow container.

2. A submergible chamber according to claim 1 wherein the hood comprises an uninterrupted transparent wall and is releasibly connected to the lower island segment.

3. A submergible chamber according to claim 1 further comprising a gas influent structure for pressuring the chamber to exclude water therefrom to a desired extent.

4. A submergible chamber according to claim 3 further comprising a single site gas effluent structure for discharging a predetermined amount of pressurized gas from the chamber.

5. A submergible chamber according to claim 1 wherein the hood is releasibly joined to the island segment by connectors.

6. A submergible chamber according to claim 5 wherein the connectors comprise male and female interfitting connectors.

7. A submergible chamber according to claim 6 wherein the male and female connectors are releasibly locked together in force-fit relationship.

8. A submergible chamber according to claim 6 wherein the male and female connectors are releasibly located together by biaxial linear displacement.

9. A submergible chamber according to claim 1 wherein the island segment comprises a previous floor.

10. A submergible chamber according to claim 1 wherein the island segment comprises containment side wall structure contiguously superimposed upon the base plate, with particulate material disposed within the side wall structure upon the base plate.

11. A submergible chamber according to claim 1 wherein the island segment comprises an ingress/egress opening for amphibious creatures.

12. A submergible chamber according to claim 1 wherein the island segment comprises spaced side wall segments, one having a greater height than the other.

13. A submergible chamber according to claim 1 wherein the island segment comprises an ingress/egress opening for an air influent structure.

14. A submergible chamber into which amphibious creatures ingress and egress for subterranean access to air, the chamber comprising an upper hood and a lower island segment, the lower island segment comprising at least one hollow container with particulate matter disposed within the hollow of the hollow container, a gas influent structure for pressurizing the chamber to exclude water therefrom to a desired extent, a gas effluent structure for discharging a predetermined amount of pressurized gas from the chamber, the gas effluent structure comprising an L-shaped tube rotatably mounted to the hood and comprising a distal end such that rotation of the distal end of the L-shaped tube will vary the elevation of a gas/water interface within the chamber.

15. A submergible chamber into which amphibious creatures ingress and egress for subterranean access to air, the chamber comprising an upper hood and a lower island segment, the lower island segment comprising at least one hollow container with particulate matter disposed within the hollow of the hollow container, the island segment comprising at least two islands.

16. A submergible chamber according to claim 15 further comprising a channel disposed between the at least two islands in which water life may swim.

17. A submergible chamber according to claim 16 further comprising a bridge between the at least two islands over the channel.

18. A hollow bio-chamber for submerged disposition in an aquarium, the bio-chamber comprising a hood segment and a lower island segment held in place by gravity, the lower island segment comprising at least one cup-shaped container comprising side wall structure and floor structure, the container being adapted to rest directly at a desired location within an aquarium without other supporting structure and particulate matter disposed in the cup-shaped container upon the floor structure, the particulate matter comprising a resting place for amphibious creatures exposed to both air under pressure and water within the bio-chamber, flow path structure by which the air under pressure from a source is discharged above a water line in the bio-chamber to provide an air environment which substantially excludes water from a desired portion of the bio-chamber, the flow path structure passing through a channel of water existing in the bio-chamber adjacent to the at least one cup-shaped container.

19. An air entrained underwater habitat for amphibious creatures comprising an air-receiving canopy superimposed over a bifurcated base, a base entry being disposed within the bifurcation, the entry comprising a through channel in which water life may swim and from which the amphibious creatures emerge upon the base below the canopy within an underwater air entrained environment.

\* \* \* \* \*